US011106328B1

United States Patent
Holland et al.

(10) Patent No.: US 11,106,328 B1
(45) Date of Patent: Aug. 31, 2021

(54) PRIVATE CONTROL INTERFACES FOR EXTENDED REALITY

(71) Applicant: QUALCOMM Incorporated, San Diego, CA (US)

(72) Inventors: Wesley James Holland, Encinitas, CA (US); Ramesh Chandrasekhar, Oceanside, CA (US); Daniel James Guest, San Diego, CA (US); Sebastien Mounier, San Diego, CA (US); Bijan Forutanpour, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/941,346

(22) Filed: Jul. 28, 2020

(51) Int. Cl.
*G06F 3/0481* (2013.01)
*G06F 21/32* (2013.01)
*G02B 27/01* (2006.01)
*G06T 19/00* (2011.01)

(52) U.S. Cl.
CPC ....... *G06F 3/04815* (2013.01); *G02B 27/017* (2013.01); *G06F 21/32* (2013.01); *G06T 19/006* (2013.01)

(58) Field of Classification Search
None
See application file for complete search history.

(56) References Cited

U.S. PATENT DOCUMENTS

| 7,084,887 | B1 * | 8/2006 | Sato | A63F 13/10 345/633 |
| 8,502,780 | B1 * | 8/2013 | Park | G06F 3/04886 345/165 |
| 8,539,560 | B2 * | 9/2013 | Angaluri | G06F 21/32 726/6 |
| 9,466,266 | B2 * | 10/2016 | Hildreth | G06T 19/006 |
| 10,776,475 | B2 * | 9/2020 | Ohkado | G06F 21/36 |
| 10,803,668 | B2 * | 10/2020 | Jones | G06F 3/011 |

(Continued)

OTHER PUBLICATIONS

Maiti, Anindya, Murtuza Jadliwala, and Chase Weber. "Preventing shoulder surfing using randomized augmented reality keyboards." 2017 IEEE International Conference on Pervasive Computing and Communications Workshops (PerCom Workshops). IEEE, 2017.*

(Continued)

*Primary Examiner* — Ryan M Gray
(74) *Attorney, Agent, or Firm* — Qualcomm Incorporated

(57) ABSTRACT

Systems, methods, and non-transitory media are provided for generating private control interfaces for extended reality (XR) experiences. An example method can include determining a pose of an XR device within a mapped scene of a physical environment associated with the XR device; detecting a private region in the physical environment and a location of the private region relative to the pose of the XR device, the private region including an area estimated to be within a field of view (FOV) of a user of the XR device and out of a FOV of a person in the physical environment, a recording device in the physical environment, and/or an object in the physical environment; based on the pose of the XR device and the location of the private region, mapping a virtual private control interface to the private region; and rendering the virtual private control interface within the private region.

30 Claims, 12 Drawing Sheets

(56) References Cited

U.S. PATENT DOCUMENTS

| | | | | |
|---|---|---|---|---|
| 2011/0319166 | A1* | 12/2011 | Bathiche | A63F 13/843 |
| | | | | 463/40 |
| 2012/0242695 | A1* | 9/2012 | Martin | G06F 21/42 |
| | | | | 345/633 |
| 2013/0083066 | A1* | 4/2013 | Aoki | H04M 1/72427 |
| | | | | 345/633 |
| 2016/0007007 | A1* | 1/2016 | Nevet | G06K 9/2081 |
| | | | | 726/19 |
| 2016/0180594 | A1* | 6/2016 | Todeschini | G02B 27/0179 |
| | | | | 345/633 |
| 2020/0150782 | A1* | 5/2020 | Gupta | G06F 3/012 |
| 2020/0226966 | A1* | 7/2020 | Shin | G06F 21/84 |

OTHER PUBLICATIONS

Zhou, Huiyuan, et al. "Enhancing Mobile Content Privacy with Proxemics Aware Notifications and Protection." Proceedings of the 2016 CHI Conference on Human Factors in Computing Systems. 2016.*

Kreider, Christopher. "An Exploration of Countermeasures for Augmented Reality Shoulder Surfing Attacks." Southern Association for Information Systems, St. Simons Island (2019).*

Clark, Adrian. "Hybrid AR User Interfaces in Collaborative Gaming." (2004).*

* cited by examiner

US 11,106,328 B1

PRIVATE CONTROL INTERFACES FOR EXTENDED REALITY

TECHNICAL FIELD

The present disclosure generally relates to generating and registering private control interfaces in extended reality and other applications.

BACKGROUND

Extended reality technologies can be used to present virtual content to users, and/or can combine real environments from the physical world and virtual environments to provide users with extended reality experiences. The term extended reality can encompass virtual reality, augmented reality, mixed reality, and the like. Each of these forms of extended reality allows users to experience or interact with immersive virtual environments or content. For example, an extended reality experience can allow a user to interact with a real or physical environment enhanced or augmented with virtual content.

Extended reality technologies can be implemented to enhance user experiences in a wide range of contexts, such as entertainment, healthcare, retail, education, social media, among others. However, in many settings, it can be undesirable to reveal certain extended reality content or interactions with certain extended reality interfaces. In one example, a user many not want an authentication interface, such as a password prompt, to be rendered in a way that may allow other users to see or infer specific user interactions with the authentication interface or associated authentication information.

BRIEF SUMMARY

Disclosed are systems, methods, and computer-readable media for providing private control interfaces for extended reality experiences. According to at least one example, a method is provided for generating private control interfaces for extended reality experiences. The method can include: determining a pose of an extended reality device within a mapped scene of a physical environment associated with the extended reality device; detecting a private region in the physical environment and a location of the private region relative to the pose of the extended reality device, the private region including an area estimated to be within a field of view (FOV) of a user of the extended reality device and out of a respective FOV of at least one of a person in the physical environment, a recording device in the physical environment, and/or an object in the physical environment that enables viewing access from outside of the physical environment; based on the pose of the extended reality device and the private region being detected, mapping a virtual private control interface to the private region, the virtual private control interface including one or more input interface elements; and rendering the virtual private control interface within the private region in the mapped scene.

According to at least one example, a non-transitory computer-readable medium is provided for providing private control interfaces for extended reality experiences. The non-transitory computer-readable medium can include computer-readable instructions which, when executed by one or more processors, cause the one or more processors to: determine a pose of an extended reality device within a mapped scene of a physical environment associated with the extended reality device; detect a private region in the physical environment and a location of the private region relative to the pose of the extended reality device, the private region including an area estimated to be within a FOV of a user of the extended reality device and out of a respective FOV of at least one of a person in the physical environment, a recording device in the physical environment, and/or an object in the physical environment that enables viewing access from outside of the physical environment; map, based on the pose of the extended reality device and the private region being detected, a virtual private control interface to the private region, the virtual private control interface including one or more input interface elements; and render the virtual private control interface within the private region in the mapped scene.

According to at least one example, an apparatus is provided for providing private control interfaces for extended reality experiences. The apparatus can include at least one memory and one or more processors implemented in circuitry and configured to: determine a pose of an apparatus within a mapped scene of a physical environment associated with the apparatus; detect a private region in the physical environment and a location of the private region relative to the pose of the apparatus, the private region including an area estimated to be within a FOV of a user of the apparatus and out of a respective FOV of at least one of a person in the physical environment, a recording device in the physical environment, and/or an object in the physical environment that enables viewing access from outside of the physical environment; map, based on the pose of the apparatus and the private region being detected, a virtual private control interface to the private region, the virtual private control interface including one or more input interface elements; and render the virtual private control interface within the private region in the mapped scene.

According to at least one example, another apparatus is provided for providing private control interfaces for extended reality experiences. The apparatus can include: means for determining a pose of an apparatus within a mapped scene of a physical environment associated with the apparatus; means for detecting a private region in the physical environment and a location of the private region relative to the pose of the apparatus, the private region including an area estimated to be within a FOV of a user of the apparatus and out of a respective FOV of at least one of a person in the physical environment, a recording device in the physical environment, and/or an object in the physical environment that enables viewing access from outside of the physical environment; means for mapping, based on the pose of the apparatus and the location of the private region, a virtual private control interface to the private region, the virtual private control interface including one or more input interface elements; and means for rendering the virtual private control interface within the private region in the mapped scene.

In some aspects, the method, non-transitory computer-readable medium, and apparatuses described above can include determining that the area is out of the respective FOV of the at least one of the person, the recording device, and/or the object by: detecting one or more objects in the physical environment; and determining that the respective FOV of the at least one of the person, the recording device, and the object is occluded by the one or more objects.

In some examples, detecting the private region can include calculating human face location data associated with a first face detected in an image capturing the mapped scene, wherein the first face corresponds to the person; based on the human face location data, calculating a FOV of the person;

and determining, based on the FOV of the person and the location of the private region, that the private region is occluded from a view of the person by one or more objects located between the private region and the person.

In some examples, detecting the private region further can include calculating human face location data associated with a second face detected in the image capturing the mapped scene, wherein the second face corresponds to the user; based on the human face location data associated with the second face, calculating the FOV of the user; and determining, based on the location of the private region, that the private region is within the FOV of the user.

In some examples, mapping the virtual private control interface to the private region and rendering the virtual private control interface within the private region can include: determining at least one of a first size of the private region and/or a first orientation of the private region; determining, based on the at least one of the first size of the private region and/or the first orientation of the private region, at least one of a second size of the virtual private control interface and/or a second orientation of the virtual private control interface, wherein the second size of the virtual private control interface matches or fits within the first size of the private region, and wherein the second orientation of the virtual private control interface at least partially aligns with the first orientation of the private region; generating the virtual private control interface according to the at least one of the second size and/or the second orientation; and aligning the virtual private control interface with the private region.

In some examples, the object in the physical environment that enables viewing access from outside of the physical environment can include a window, a glass door, and/or an open door.

In some examples, the private region can include a surface of a body part associated with the user, and wherein the detecting the private region can include determining that the surface of the body part is facing the user and facing away from the at least one of the person in the physical environment, the recording device in the physical environment, and/or the object in the physical environment. In some cases, the body part can include a hand and the surface of the body part can include a palm of the hand, and detecting the private region can include: detecting, based on one or more images of the palm of the hand, biometric information associated with the palm of the hand; comparing the biometric information with previously-registered biometric information associated with a previously-registered palm associated with the user; and determining that the biometric information matches the previously-registered biometric information.

In some aspects, the method, non-transitory computer-readable medium, and apparatuses described above can include identifying a palm of a hand for rendering a second virtual private control interface; and prior to rendering the second virtual private control interface on the palm of the hand: detecting, based on one or more images of the palm of the hand, biometric information associated with the palm of the hand; comparing the biometric information with previously-registered biometric information associated with a previously-registered palm associated with the user; and determining whether the biometric information matches the previously-registered biometric information.

In some aspects, the method, non-transitory computer-readable medium, and apparatuses described above can include determining that the biometric information does not match the previously-registered biometric information; and in response to determining that the biometric information does not match the previously-registered biometric information, determining not to render the second virtual private control interface on the palm of the hand.

In some aspects, detecting the private region can include detecting one or more objects in the physical environment; detecting, based on the one or more objects in the physical environment, one or more occlusions in the physical environment; and detecting the private region by determining that the one or more occlusions block a visibility of the private region by the person, recording device, and/or the object.

In some examples, detecting the one or more occlusions in the physical environment can include tracing a path of a ray within the physical environment.

In some cases, the recording device can include a camera, and the virtual private control interface can include an augmented reality interface. In some examples, each apparatus described above can be a mobile device. In other examples, each apparatus described above can include an extended reality device.

In some aspects, the apparatuses described above can include or be part of a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1:
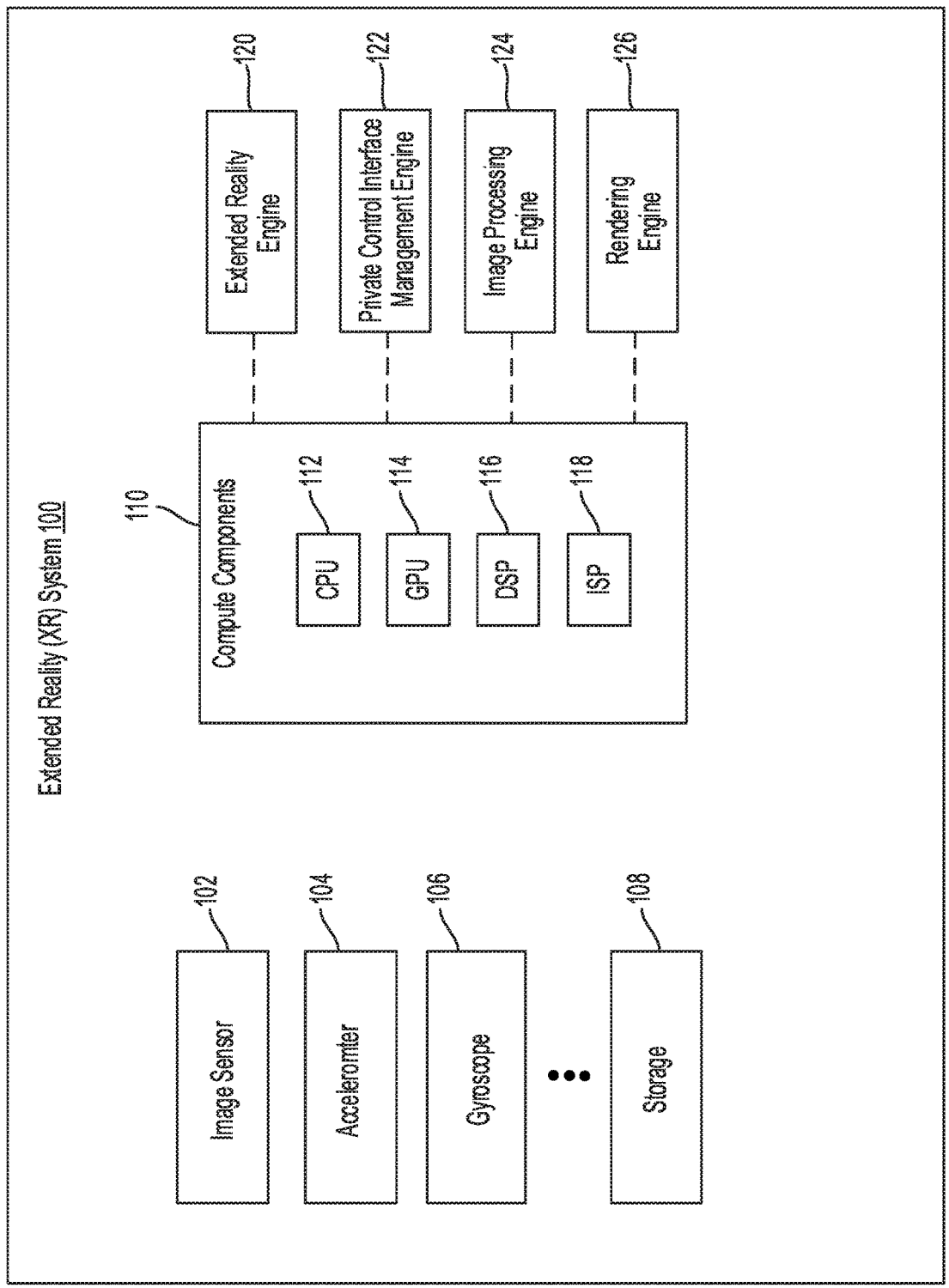
FIG. 1 is a simplified block diagram illustrating an example extended reality system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Extended reality devices, such as head-mounted displays (HMDs) and smart glasses, can track the hand and/or fingertips of users to allow users to use their hand and/or fingertips to control interfaces rendered within an extended reality (XR) environment, such as a virtual reality (VR) environment, an augmented reality (AR) environment, a mixed reality (MR) environment, and/or other XR environment. Moreover, a user's hand or fingertip interactions with a control interface in an XR environment can be visible by other users in the environment. However, it is often undesirable to reveal such interactions with the control interface and/or to allow such interactions to be potentially visible to other users. For instance, if a user engaged in a multi-user AR experience inputs private information using a control interface rendered during the multi-user AR experience, other users in the multi-user AR experience will be able to see the control interface as well as the user's interactions with the control interface. Consequently, the other users in the multi-user AR experience may be able to ascertain any information provided by the user through the user's interactions with the control interface. As a result, the user may inadvertently expose such information to the other users which, in some cases, may include private, confidential, or personal information.

In some cases, even if other users are not able to see the control interface or the interface elements that a user is interacting with during an XR experience, the hand or fingertip interactions of the user may still be interpretable by others, in which case inputs (and corresponding information) associated with the interactions may be inferred by the other users. For example, if the user is engaged in an AR experience around other users, the other users may be able to see the user's hand and/or fingertip interactions with the control interface. Moreover, the user's hand and/or fingertip interactions may reveal that the user is air typing on a virtual keyboard or interacting with some other virtual interface. Based on the user's hand and/or fingertip movements or patterns in the user's hand and/or fingertip movements, other users may be able to infer the type of virtual interface the user is interacting with and interpret the inputs provided by the user. The inputs may consequently reveal the user's information which, in many cases, may involve private or confidential information.

Additionally, if the user's interactions with the virtual interface are within a field-of-view (FOV) of a recording device, such as a camera, the user's interactions could inadvertently be recorded by the recording device. Another user with access to the recording could then review the recording and interpret the user's interactions and associated information from the recording. The recording may even allow the other user to interpret the user's interactions and associated information with greater ease and/or accuracy. Moreover, in some cases, a computer can be used to process the recording and recognize the user's interactions and associated information from the recorded video, potentially putting the privacy of the user's information at an even greater risk.

In some cases, an artificial intelligence (AI) interpreter or system can be used to process the recorded video and identify the information provided by the user through the virtual interface. The AI interpreter or system could potentially recognize the information provided by the user through the virtual interface with significant accuracy. Accordingly, when a user is engaged in an XR experience, to avoid exposing inputs and associated information to other users, the user may want to protect the privacy of interactions with virtual interfaces rendered in the XR environment even if other users are not also engaged in the XR experience or able to see the virtual interface.

In one illustrative example, a user's interaction with a virtual interface rendered during an XR experience, such as a virtual keyboard, to enter a password can potentially be interpreted by other users, which can allow such users to identify or infer the password entered by the user. As previously noted, the other users may be able to infer the password entered by the user even if the other users are not engaged in the same XR experience or able to see the virtual interface. To illustrate, in a typing XR setting using a virtual keyboard, a user's typing motions can indicate an interaction with the virtual keyboard. The typing motions may allow other users to infer key locations and typed data, such as a typed password. Such exposure of typed data, such as password information, can present significant security and privacy concerns to the user.

In another example, a user's interaction with a virtual voting button in a virtual classroom poll or quiz can be interpreted by other users, which can allow the other users to identify or infer the vote submitted by the user and compromise the integrity of the user's vote and/or the classroom poll or quiz. For example, other users taking the same virtual classroom poll or quiz may be able to see the virtual interface used by the user to interact with the virtual button. Accordingly, if the other users see the user's interaction with the virtual button, the other users may be able to identify the user's answer to the classroom poll or quiz. Even if the other users are not also taking the virtual classroom poll or quiz or otherwise able to see the virtual voting button, the users may still be able to infer the location and significance of input buttons selected by the user through observation over multiple questions. By inferring the location and significance of the input buttons, the other users may deduce the votes submitted by the user through the virtual classroom poll or quiz.

Similarly, a user's interaction with virtual gaming controls in a multi-user AR gaming experience, such as a multi-user AR table-top game, can be interpreted by other users. For example, users in a multi-user AR gaming experience can see virtual gaming content mixed with the physical world around them (e.g., rendered on physical objects or regions), and thus may see the virtual gaming controls provided to the user as well as the user's interaction with the virtual gaming controls. Accordingly, the other users may be able to identify or infer the user's input through the virtual gaming controls. Moreover, in some cases, even if the users are unable to see the same virtual gaming controls, the other users may be able to infer the location and significance of input buttons selected by the user by observing the user's interactions throughout the game. This may allow the other users in the game to deduce the user's inputs and associated information in the game. However, in many cases, such as competitive gaming scenarios, the user many not want other users in the multi-user AR game to learn the user's input through the virtual gaming controls as it can put the user in a competitive disadvantage with those other users.

The present disclosure describes systems, methods, and computer-readable media for generating private control interfaces for XR experiences. In some examples, the approaches disclosed herein can hide virtual control interfaces (also referred to as "virtual private control interfaces") presented to a user as part of an XR environment from other users, devices and/or objects in the physical environment of the user, and can hide or obfuscate the user's interactions with the virtual control interfaces to protect the privacy of the user's interactions and data from nearby users and/or recording devices. A virtual control interface can also be referred to herein as a virtual interface. In some examples, the virtual control interfaces can be rendered within a private region of the physical environment of the user (e.g., the real-world environment). As used herein, a control interface (e.g., a private control interface, a virtual control interface, a virtual private control interface, etc.) can include a rendered interface with input fields and/or input interface elements, but can also include a rendered field without input fields and/or input interface elements, such as an interface with static or display-only content.

The private region can be, for example and without limitation, a region or location in the user's physical environment (e.g., the real world) estimated to be outside of a view of other users or recording devices (e.g., cameras, microphones) and/or obscured from other users or recording devices. The private region can be used to render virtual control interfaces for a user during an XR experience to prevent unintended users and devices from seeing or interpreting the user's interactions with the virtual control interfaces and/or inferring the data entered by the user in such virtual control interfaces. In some examples, rendering a virtual control interface on a private region can include rendering or displaying the virtual control interface on an XR device in a manner that appears to a user viewing the virtual control interface through/from the XR device as if the virtual control interface was presented, projected, or located on the private region. For example, rendering a virtual control interface on a private region can include rendering a virtual overlay of the virtual control interface on the private region. In other examples, rendering a virtual control interface on a private region can include projecting the virtual control interface on the region or location in the physical environment corresponding to the private region. Moreover, since the virtual control interface appears to the user with the XR device to be rendered on the private region (or is projected on the private region), the user can interact with the virtual control interface as if the virtual control interface is actually on the private region in the physical environment. Because the private region is not visible to other users and/or recording devices in the physical environment, the other users and/or recording devices will not be able to see the user's interactions with the virtual control interface or infer input data associated with such interactions For example, in the virtual keyboard example above, the virtual keyboard can be rendered within a private location in the physical environment (e.g., an object in the real world environment, a surface in the real world environment, a plane in the real world environment, etc.) where the user is located, to prevent other users in the physical environment from inferring key locations or typed data. The user can see both the private location and the virtual keyboard through an XR device (e.g., a head-mounted display, AR glasses, etc.), but other users or devices will not be able to see the user's interactions with the virtual keyboard while it is rendered in the private location. Accordingly, the other users will not be able to see the user's interactions with the virtual keyboard to potentially infer the information entered by the user through the virtual keyboard, even if the users are also using an XR device and engaged in the same XR experience as the user.

In the virtual classroom poll or quiz example above, the virtual buttons can be rendered within a private location in the physical environment to prevent other users in the physical environment from inferring the location and significance of such virtual buttons and thereby inferring user inputs. Similarly, the user can see both the private location and the virtual buttons through an XR device, but other users or devices will not be able to see the user's interactions with the virtual buttons while rendered in the private location. In the multi-user AR gaming example above, virtual buttons in the AR game can be rendered in a private location in the physical environment to prevent other users in the physical environment from inferring the location and significance of the buttons and thereby inferring user inputs. Again, the user can see both the private location and the virtual buttons through an XR device, but other users or devices will not be able to see the user's interactions with the virtual buttons while rendered in the private location.

The terms "private location" and "private region" are used interchangeably herein, and can include a surface in a physical environment, an object in a physical environment, a plane in a physical environment, an area in a physical environment, a configuration associated with a physical environment, an occlusion in a physical environment, a region in a physical environment, etc., that is within the user's field-of-view (FOV) but outside of a FOV of other users or recording devices in the physical environment, and/or that may not be visible to other users or recording devices through an object in the physical environment, such as a window or door. Accordingly, when a private control interface is rendered in a private location on the physical environment of a user, the user can interact with the private control interface without exposing the interactions and associated information to users, devices, and/or objects in the physical environment.

In some examples, an XR device of the user can identify a front-facing surface or plane in a physical environment relative to the user's position/location in the physical environment, and determine whether that surface or plane is outside of a view of other users or recording devices or whether that surface or plane is obscured from other users or recording devices. If the surface or plane is outside of a view of, or obscured from, other users or recording devices, the surface or plane can be selected as a private location. The XR device can then render any virtual control interfaces on that private location to prevent other users or recording devices in the physical environment from seeing interactions by the user with such virtual control interfaces and/or inferring the significance and information associated with such interactions. The user can see the virtual control interfaces rendered on the private location through the XR device, which allows the user to see virtual content rendered by the XR as well as the physical environment of the user. However, other users in the physical environment cannot see the private location and therefore cannot see or interpret the user's interactions with the virtual control interfaces, even if such users engaged in the same XR experience through respective XR devices.

For example, the XR device of the user can detect a book, a clipboard, the user's hand, a mobile phone, or any other object located in front of the user (or within a FOV of the user) in the physical environment and can determine that the surface of the book, clipboard, hand, mobile phone, or other object facing the user (or within the FOV of the user) is outside of a view of, or occluded (e.g., by one or more objects) from, other users and/or recording devices in the physical environment. The XR device can then render any virtual control interface such that it appears to the user to be on that surface of the book, clipboard, hand, mobile phone, or other object when viewed from the XR device. Since the virtual control interface appears to the user with the XR device to be rendered on the surface of the book, clipboard, hand, mobile phone, or other object, the user will interact with the virtual control interface as if the virtual control interface is actually on the surface of the book, clipboard, hand, mobile phone, or other object in the physical environment. Because the surface of the book, clipboard, hand, mobile phone, or other object is not visible to other users and/or recording devices in the physical environment, the other users and/or recording devices will not be able to see the user's interactions with the virtual control interface or infer input data associated with such interactions. Thus, by rendering the virtual interface on the book, clipboard, hand, mobile phone, or other object, the XR device can protect the user's interactions and data.

In some cases, the XR device can detect human faces (e.g., the faces of the user associated with the XR device and/or other users) and use human face recognition data (e.g., data indicating a presence and/or location of one or more users) and/or occlusion data (e.g., data indicating that an area or location is occluded by one or more objects or otherwise occluded from other users or devices) to detect any private locations (e.g., private surfaces, regions, locations, planes, etc.) that are occluded from (or outside a view of) other users and devices in the physical environment, except for the user associated with the XR device. The human face recognition data can be self-reported by other devices, provided by the user associated with the XR device, detected by the XR device using facial recognition technologies (e.g., neural networks, facial recognition algorithms, etc.), and/or detected by a server in communication with the XR device using information provided by the XR device and using facial recognition technologies. In some cases, the occlusion data can be calculated using ray tracing or other mechanism(s). The XR device can then render any virtual control interfaces within the private locations in the physical environment.

In some examples, the XR device can resize (e.g., scale), reorient and/or reconfigure the virtual control interface so that the virtual control interface fits within the private location and can be aligned with the private location to maintain the virtual control interface hidden or occluded from other users and/or recording devices. For example, if the private location is a surface of a book facing the user associated with the XR device and outside of a FOV of other users or recording devices in the environment, the XR device can resize, reorient, and/or reconfigure the virtual control interface so it can be rendered within the surface of the book and aligned within the boundaries of the surface of the book. In some cases, the XR device can also select a shape and/or configuration for the virtual control interface that best aligns or fits in the private location.

In some cases, the XR device can determine whether to render a virtual control interface in a private location based on, for example and without limitation, user preferences, system preferences (e.g., XR device preferences), application preferences (e.g., XR application preferences), application and/or content terms, laws or regulations, best practices, security norms, potential security implications or risks associated with the virtual control interface and/or associated data, the type of information associated with the virtual control interface, the type of virtual control interface, a level of privacy, etc. For example, a user can specify what applications, controls, and/or types of data should be private. The XR device can then render virtual control interfaces associated with such applications, controls, and/or types of data within private locations.

Figure 10:
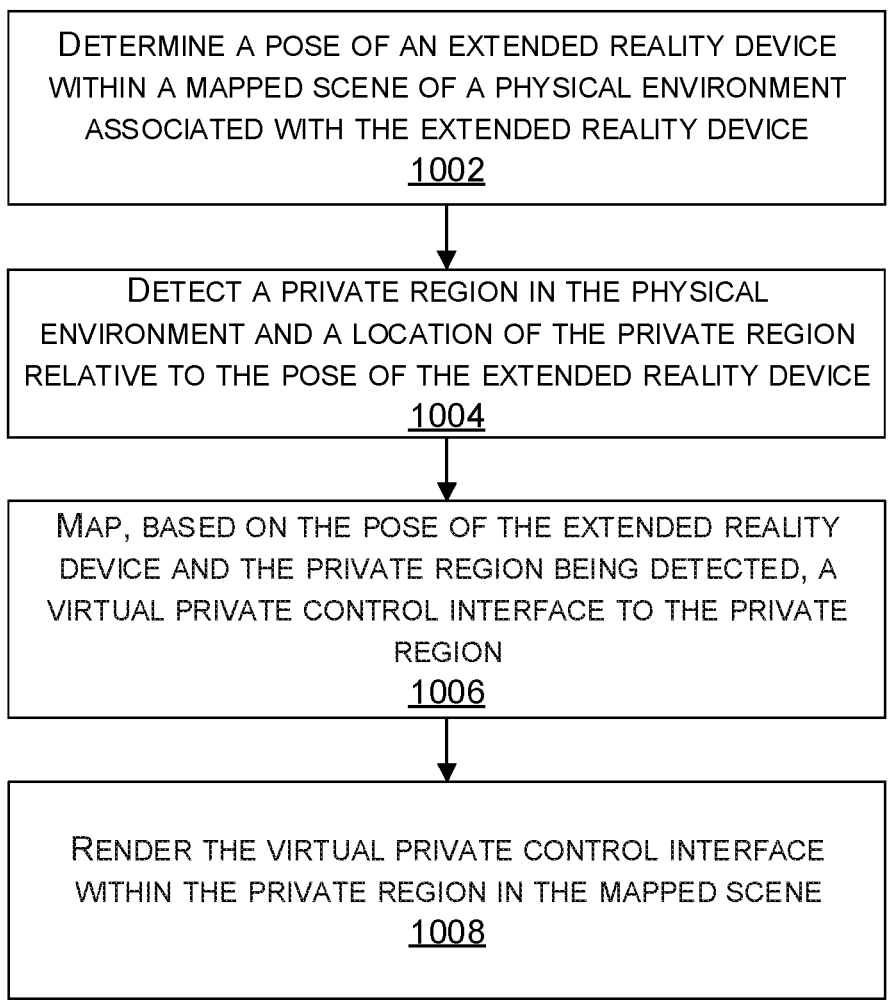
FIG. 10 is a flow diagram illustrating an example method for generating private control interfaces for extended reality experiences, in accordance with some examples of the present disclosure.
Figure 11:
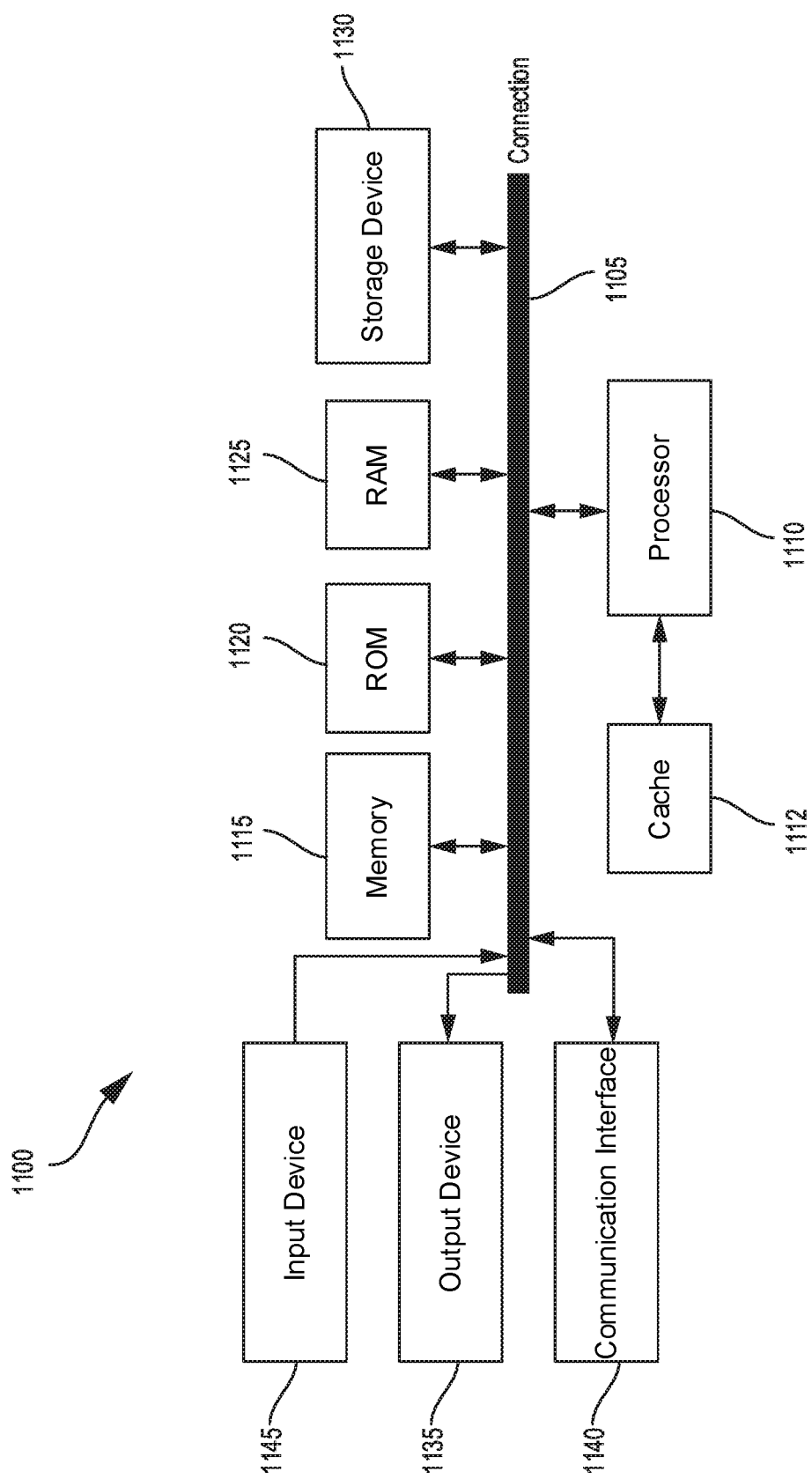
FIG. 11 illustrates an example computing device architecture, in accordance with some examples of the present disclosure.

The present technologies will be described in the following disclosure as follows. The discussion begins with a description of example systems and technologies for providing private interface controls for XR experiences, as illustrated in FIG. 1 through FIG. 9. A description of an example method for providing private interface controls for XR experiences, as illustrated in FIG. 10, will then follow. The discussion concludes with a description of an example computing device architecture including example hardware components suitable for performing XR functionalities and providing private interface controls for XR experiences, as illustrated in FIG. 11. The disclosure now turns to FIG. 1

FIG. 1 is a diagram illustrating an example extended reality system 100, in accordance with some aspects of the disclosure. The extended reality system 100 can run (or execute) XR applications and implement XR operations. In some examples, the extended reality system 100 can perform tracking and localization, mapping of the physical world and/or environment (e.g., a scene) around the extended reality system 100, and positioning and rendering of virtual content on a screen, display, and/or visible plane/region as part of an XR experience. For example, the extended reality system 100 can generate a map (e.g., a three-dimensional (3D) map) of a scene in the physical world around the extended reality system 100, track a pose (e.g., location and position) of the extended reality system 100 relative to the scene (e.g., relative to the 3D map of the scene), position and/or anchor virtual content in a specific location(s) on the map of the scene, and render the virtual content on a display/screen such that the virtual content appears to be at a location in the scene corresponding to the specific location on the map of the scene where the virtual content is positioned and/or anchored.

In this illustrative example, the extended reality system 100 includes one or more image sensors 102, an accelerometer 104, a gyroscope 106, storage 108, compute components 110, an XR engine 120, a private control interface management engine 122, an image processing engine 124, and a rendering engine 126. It should be noted that the components 102-126 shown in FIG. 1 are non-limiting examples provided for illustrative and explanation purposes, and other examples can include more, less, or different components than those shown in FIG. 1. For example, in some cases, the extended reality system 100 can include one or more other sensors (e.g., one or more inertial measurement units (IMUs), radars, light detection and ranging (LIDAR) sensors, audio sensors, etc.), one or more display devices, one more other processing engines, one or more other hardware components, and/or one or more other software and/or hardware components that are not shown in FIG. 1. An example architecture and example hardware components that can be implemented by the extended reality system 100 are further described below with respect to FIG. 11.

Moreover, for simplicity and explanation purposes, the one or more image sensors 102 will be referenced herein as an image sensor 102 (e.g., in singular form). However, one of ordinary skill in the art will recognize that the extended reality system 100 can include a single image sensor or multiple image sensors. Also, references to any of the components (e.g., 102-126) of the extended reality system 100 in the singular or plural form should not be interpreted as limiting the number of such components implemented by the extended reality system 100 to one or more than one. For example, references to an accelerometer 104 in the singular form should not be interpreted as limiting the number of accelerometers implemented by the extended reality system 100 to one. One of ordinary skill in the art will recognize that, for any of the components 102-126 shown in FIG. 1, the extended reality system 100 can include only one of such component(s) or more than one of such component(s).

The extended reality system 100 can be part of, or implemented by, a single computing device or multiple computing devices. In some examples, the extended reality system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a smart television, a display device, a gaming console, a video streaming device, an IoT (Internet-of-Things) device, a smart wearable device (e.g., a head-mounted display (HMD), smart glasses, etc.), or any other suitable electronic device(s).

In some implementations, the one or more image sensors 102, the accelerometer 104, the gyroscope 106, storage 108, compute components 110, XR engine 120, private control interface management engine 122, image processing engine 124, and rendering engine 126 can be part of the same computing device. For example, in some cases, the one or more image sensors 102, the accelerometer 104, the gyroscope 106, storage 108, compute components 110, XR engine 120, private control interface management engine 122, image processing engine 124, and rendering engine 126 can be integrated into a smartphone, laptop, tablet computer, smart wearable device, gaming system, and/or any other computing device. However, in some implementations, the one or more image sensors 102, the accelerometer 104, the gyroscope 106, storage 108, compute components 110, XR engine 120, private control interface management engine 122, image processing engine 124, and rendering engine 126 can be part of two or more separate computing devices. For example, in some cases, some of the components 102-126 can be part of, or implemented by, one computing device and the remaining components can be part of, or implemented by, one or more other computing devices.

The image sensor 102 can include any image and/or video sensors or capturing devices, such as a digital camera sensor, a video camera sensor, a smartphone camera sensor, an image/video capture device on an electronic apparatus such as a television or computer, a camera, etc. In some cases, the image sensor 102 can be part of a camera or computing device such as an XR device (e.g., an HMD, smart glasses, etc.), a digital camera, a smartphone, a smart television, a game system, etc. In some examples, the image sensor 102 can be part of a multiple-camera assembly, such as a dual-camera assembly. The image sensor 102 can capture image and/or video content (e.g., raw image and/or video data), which can then be processed by the compute components 110, the XR engine 120, the private control interface management engine 122, the image processing engine 124, and/or the rendering engine 126 as described herein.

In some examples, the image sensor 102 can capture image data and generate frames based on the image data and/or provide the image data or frames to the XR engine 120, the private control interface management engine 122, the image processing engine 124 and/or the rendering engine 126 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

The accelerometer 104 can detect acceleration by the extended reality system 100 and generate acceleration measurements based on the detected acceleration. The gyroscope 106 can detect and measure the orientation and angular velocity of the extended reality system 100. For example, the gyroscope 106 can be used to measure the pitch, roll, and yaw of the extended reality system 100. In some examples, the image sensor 102 and/or the XR engine 120 can use measurements obtained by the accelerometer 104 and the gyroscope 106 to calculate the pose of the extended reality system 100. As previously noted, in other examples, the extended reality system 100 can also include other sensors, such as a magnetometer, a machine vision sensor, a smart scene sensor, a speech recognition sensor, an impact sensor, a shock sensor, a position sensor, a tilt sensor, etc.

The storage 108 can be any storage device(s) for storing data. Moreover, the storage 108 can store data from any of the components of the extended reality system 100. For example, the storage 108 can store data from the image sensor 102 (e.g., image or video data), data from the accelerometer 104 (e.g., measurements), data from the gyroscope 106 (e.g., measurements), data from the compute components 110 (e.g., processing parameters, preferences, virtual content, rendering content, scene maps, tracking and localization data, object detection data, privacy data, XR application data, face recognition data, occlusion data, etc.), data from the XR engine 120, data from the private control interface management engine 122, data from the image processing engine 124, and/or data from the rendering engine 126 (e.g., output frames). In some examples, the storage 108 can include a buffer for storing frames for processing by the compute components 110.

The one or more compute components 110 can include a central processing unit (CPU) 112, a graphics processing unit (GPU) 114, a digital signal processor (DSP) 116, and/or an image signal processor (ISP) 118. The compute components 110 can perform various operations such as image enhancement, computer vision, graphics rendering, extended reality (e.g., tracking, localization, pose estimation, mapping, content anchoring, content rendering, etc.), image/video processing, sensor processing, recognition (e.g., text recognition, facial recognition, object recognition, feature recognition, tracking or pattern recognition, scene recognition, occlusion detection, etc.), machine learning, filtering, and any of the various operations described herein. In this example, the compute components 110 implement the XR engine 120, the private control interface management engine 122, the image processing engine 124, and the rendering engine 126. In other examples, the compute components 110 can also implement one or more other processing engines.

The operations for the XR engine 120, the private control interface management engine 122, the image processing engine 124, and the rendering engine 126 (and any image processing engines) can be implemented by any of the compute components 110. In one illustrative example, the operations of the rendering engine 126 can be implemented by the GPU 114, and the operations of the XR engine 120, the private control interface management engine 122, and the image processing engine 124 can be implemented by the CPU 112, the DSP 116, and/or the ISP 118. In some cases, the compute components 110 can include other electronic circuits or hardware, computer software, firmware, or any combination thereof, to perform any of the various operations described herein.

In some examples, the XR engine 120 can perform XR operations based on data from the image sensor 102, the accelerometer 104, the gyroscope 106, and/or one or more sensors on the extended reality system 100, such as one or more IMUs, radars, etc. In some examples, the XR engine 120 can perform tracking, localization, pose estimation, mapping, content anchoring operations and/or any other XR operations/functionalities.

The private control interface management engine 122 can perform various operations to determine (and manage) how, where, and/or when to render control interfaces, including private control interfaces, during an XR experience. An XR experience can include use of the extended reality system 100 to present XR content (e.g., virtual reality content, augmented reality content, mixed reality content, etc.) to a user. In some examples, the XR content and experience can be provided by the extended reality system 100 through an XR application that provides a specific XR experience such as, for example, an XR gaming experience, an XR classroom experience, an XR shopping experience, an XR entertainment experience, an XR activity (e.g., an operation, a troubleshooting activity, etc.), among other. During the XR experience, the user can view and/or interact with virtual content using the extended reality system 100. In some cases, the user can view and/or interact with the virtual content while also being able to view and/or interact with the physical environment around the user, allowing the user to have an immersive experience between the physical environment and virtual content mixed or integrated with the physical environment.

Private control interfaces can include any virtual interfaces that display virtual data and/or receive input data that is determined to be private and/or that should be protected from viewing access of unintended users and/or devices, such as virtual input or output interfaces for private and/or protected data. Such type of data can be defined as, or determined to be, private and/or protected based on, for example and without limitation, user preferences, system preferences, application preferences, application and/or content terms, laws or regulations, best practices, security norms, potential security implications, etc. Non-limiting examples of such type of private and/or protected data can include personal user data, passwords, pins, medical information, financial information, authentication information, player information in multi-user games, security information, password-protected data, data protected by access control lists (ACLs) and/or permissions, user account data, privileged or confidential data, etc.

In some examples, the private control interface management engine 122 can use data from the image sensor 102, the accelerometer 104, the gyroscope 106, and/or any other sensors to detect objects (e.g., windows, doors, walls, tables, books, devices, chairs, etc.) in a scene, recognize faces in a scene, detect surveillance devices in a scene (e.g., cameras, microphones, etc.), and/or any other conditions and/or characteristics of a scene. In some examples, the private control interface management engine 122 can also use data from other devices or applications, such as self-reported data from other user devices and/or data provided by a user of the extended reality system 100. The private control interface management engine 122 can use such data to identify occlusions in the scene, which can be used to render/display a private control interface for the user associated with the extended reality system 100 in a way that protects the private control interface from viewing access by other users, surveillance devices, etc., and/or can otherwise compromise the privacy of the private control interface and associated data. The occlusions can include, for example and without limitations, areas, surfaces, planes, objects, and/or regions in a scene that are visible or within a field-of-view (FOV) of the user associated with the extended reality system 100 but are not visible or within the FOV of other users and/or surveillance devices in the scene and/or that are not visible through certain objects in the scene such as a window or a door.

When the private control interface management engine 122 identifies one or more occlusions, the private control interface management engine 122 can coordinate with the XR engine 120 and/or the rendering engine 126 to render a private control interface on the one or more occlusions (e.g., on a surface, plane, region, area, location, relative proximity, etc.), to prevent viewing access of such private control interface from other users, devices, etc. In some examples, the private control interface management engine 122 can calculate and/or determine a configuration and/or presentation of a private control interface on one or more occlusions. For example, the private control interface management engine 122 can determine a size, orientation, location, interface design or scheme, and/or any other configuration for the private control interface. To illustrate, the private control interface management engine 122 can determine a configuration of the private control interface that allows the private control interface to fit within an area of the one or more occlusions and/or maintain a certain position, orientation, etc., relative to the one or more occlusions and/or other objects or users in the scene.

In some cases, the private control interface management engine 122 can detect conditions and/or events that trigger an occlusion detection, a private control interface presentation, a private control interface modification or configuration, etc. For example, the private control interface management engine 122 can detect when certain types of data and/or interfaces should be presented as, or within, a private control interface (e.g., based on preferences, rules, type of content, scene characteristics, objects in the scene, users in the scene, etc.), when a private control interface should be removed from presentation, when a private control interface should be moved from one location to another, when a private control interface should remain locked within a location or occlusion, when a private control interface should be reconfigured (e.g., scaled, re-oriented, changed or redesigned, etc.) to maintain privacy or security protections, etc.

The image processing engine 124 can perform one or more image processing operations. In some examples, the image processing engine 124 can perform image processing operations based on data from the image sensor 102. In some cases, the image processing engine 124 can perform image processing operations such as, for example, filtering, demosaicing, scaling, color correction, color conversion, segmentation, noise reduction filtering, spatial filtering, artifact correction, etc. The rendering engine 126 can obtain image data generated and/or processed by the compute components 110, the image sensor 102, the XR engine 120, and/or the image processing engine 124 and render video and/or image frames for presentation on a display device.

While the extended reality system 100 is shown to include certain components, one of ordinary skill will appreciate that the extended reality system 100 can include more or fewer components than those shown in FIG. 1. For example, the extended reality system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the extended reality system 100 is described below with respect to FIG. 11.

Figure 2:
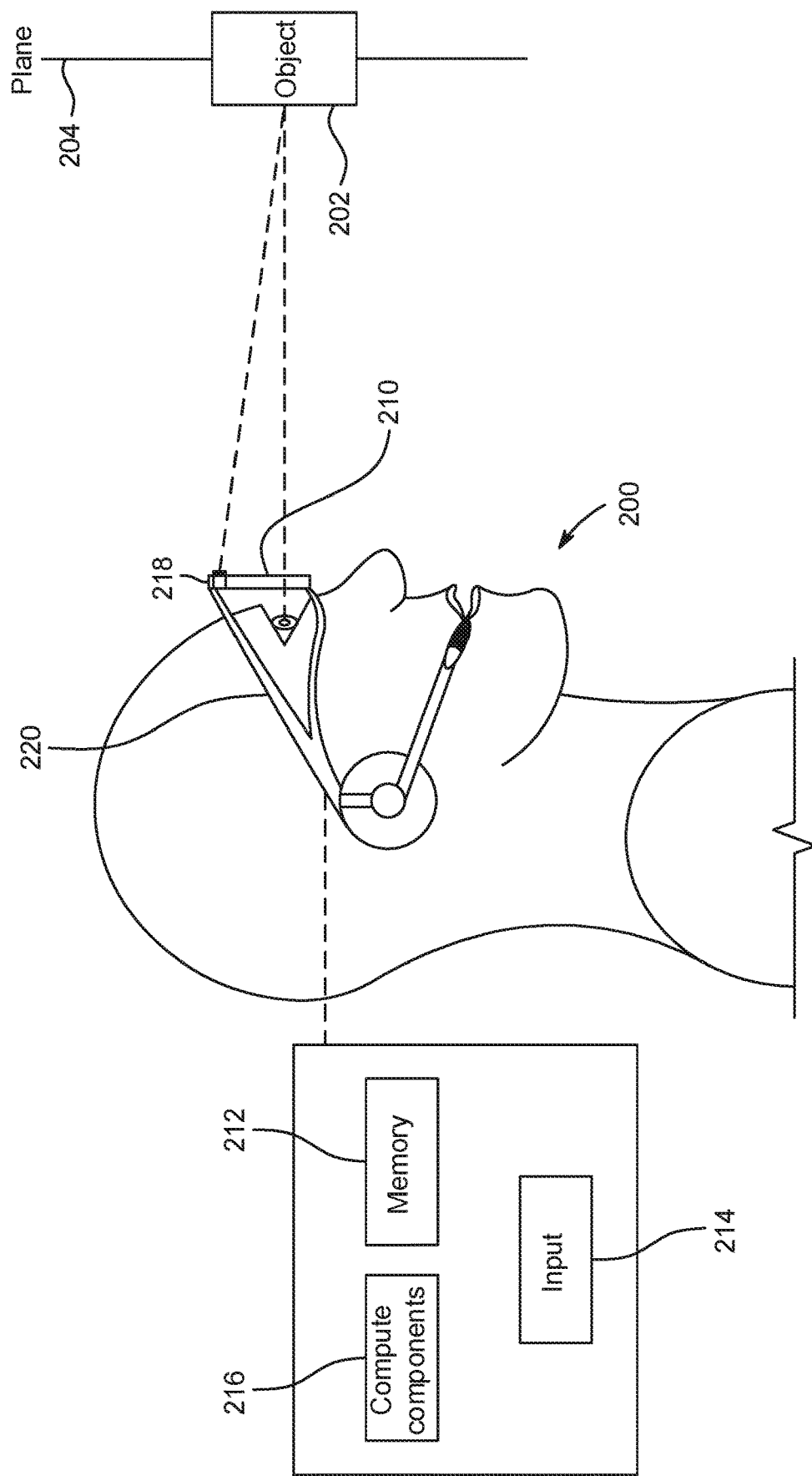
FIG. 2 is a diagram illustrating an example of an extended reality system being worn by a user, in accordance with some examples of the present disclosure.

FIG. 2 is a diagram illustrating an example of an extended reality system 220 being worn by a user 200. The extended reality system 220 can include some or all of the same components as the extended reality system 100 shown in FIG. 1 and described above, and can perform some or all of the same functions as the extended reality system 100. While the extended reality system 220 is shown in FIG. 2 as a AR glasses, the extended reality system 220 can include any suitable type of XR device, such as an HMD or other XR devices. The extended reality system 220 is described as an optical see-through AR device, which allows the user 200 to view the real world while wearing the extended reality system 220. For example, the user 200 can view an object 202 in a real-world environment on a plane 204 at a distance from the user 200. The extended reality system 220 has an image sensor 218 and a display 210 (e.g., a glass, a screen, a lens, or other display) that allows the user 200 to see the real-world environment and also allows AR content to be displayed thereon. The image sensor 218 can be similar or the same as the image sensor 102 shown in FIG. 1. While one image sensor 218 and one display 210 are shown in FIG. 2, the extended reality system 220 can include multiple cameras and/or multiple displays (e.g., a display for the right eye and a display for the left eye) in some implementations. AR content (e.g., an image, a video, a graphic, a virtual or AR object, or other AR content) can be projected or otherwise displayed on the display 210. In one example, the AR content can include an augmented version of the object 202. In another example, the AR content can include additional AR content that is related to the object 202 or related to one or more other objects in the real-world environment.

As shown in FIG. 2, the extended reality system 220 can include, or can be in wired or wireless communication with, compute components 216 and a memory 212. The compute components 216 and the memory 212 can store and execute instructions used to perform the techniques described herein. In implementations where the extended reality system 220 is in communication (wired or wirelessly) with the memory 212 and the compute components 216, a device housing the memory 212 and the compute components 216 may be a computing device, such as a desktop computer, a laptop computer, a mobile phone, a tablet, a game console, or other suitable device. The extended reality system 220 also includes or is in communication with (wired or wirelessly) an input device 214. The input device 214 can include any suitable input device, such as a touchscreen, a pen or other pointer device, a keyboard, a mouse a button or key, a microphone for receiving voice commands, a gesture input device for receiving gesture commands, any combination thereof, and/or other input device. In some cases, the image sensor 218 can capture images that can be processed for interpreting gesture commands.

The image sensor 218 can capture color images (e.g., images having red-green-blue (RGB) color components, images having luma (Y) and chroma (C) color components such as YCbCr images, or other color images) and/or grayscale images. As noted above, in some cases, the extended reality system 220 can include multiple cameras, such as dual front cameras and/or one or more front and one or more rear-facing cameras, which may also incorporate various sensors. In some cases, image sensor 218 (and/or other cameras of the extended reality system 220) can capture still images and/or videos that include multiple video frames (or images). In some cases, image data received by the image sensor 218 (and/or other cameras) can be in a raw uncompressed format, and may be compressed and/or otherwise processed (e.g., by an image signal processor (ISP) or other processor of the extended reality system 220) prior to being further processed and/or stored in the memory 212. In some cases, image compression may be performed by the compute components 216 using lossless or lossy compression techniques (e.g., any suitable video or image compression technique).

In some cases, the image sensor 218 (and/or other camera of the extended reality system 220) can be configured to also capture depth information. For example, in some implementations, the image sensor 218 (and/or other camera) can include an RGB-depth (RGB-D) camera. In some cases, the extended reality system 220 can include one or more depth sensors (not shown) that are separate from the image sensor 218 (and/or other camera) and that can capture depth information. For instance, such a depth sensor can obtain depth information independently from the image sensor 218. In some examples, a depth sensor can be physically installed in a same general location as the image sensor 218, but may operate at a different frequency or frame rate from the image sensor 218. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

In some implementations, the extended reality system 220 includes one or more sensors. The one or more sensors can include one or more accelerometers (e.g., 104), one or more gyroscopes (e.g., 106), and/or other sensors. The one or more sensors can provide velocity, orientation, and/or other position-related information to the compute components 216. In some cases, the one or more sensors can include at least one inertial measurement unit (IMU). An IMU is an electronic device that measures the specific force, angular rate, and/or the orientation of the extended reality system 220, using a combination of one or more accelerometers, one or more gyroscopes, and/or one or more magnetometers. In some examples, the one or more sensors can output measured information associated with the capture of an image captured by the image sensor 218 (and/or other camera of the extended reality system 220) and/or depth information obtained using one or more depth sensors of the extended reality system 220.

The output of one or more sensors (e.g., one or more IMUs) can be used by the compute components 216 to determine a pose of the extended reality system 220 (also referred to as the head pose) and/or the pose of the image sensor 218 (or other camera of the extended reality system 100). In some cases, the pose of the extended reality system 220 and the pose of the image sensor 218 (or other camera) can be the same. The pose of image sensor 218 refers to the position and orientation of the image sensor 218 relative to a frame of reference (e.g., with respect to the object 202). In some implementations, the camera pose can be determined for 6-Degrees Of Freedom (6DOF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference).

In some aspects, the pose of image sensor 218 and/or the extended reality system 220 can be determined and/or tracked by the compute components 216 using a visual tracking solution based on images captured by the image sensor 218 (and/or other camera of the extended reality system 220). In some examples, the compute components 216 can perform tracking using computer vision-based tracking, model-based tracking, and/or simultaneous localization and mapping (SLAM) techniques. For instance, the compute components 216 can perform SLAM or can be in communication (wired or wireless) with a SLAM engine (now shown). SLAM refers to a class of techniques where a map of an environment (e.g., a map of an environment being modeled by extended reality system 220) is created while simultaneously tracking the pose of a camera (e.g., image sensor 218) and/or the extended reality system 220 relative to that map. The map can be referred to as a SLAM map, and can be three-dimensional (3D). The SLAM techniques can be performed using color or grayscale image data captured by the image sensor 218 (and/or other camera of the extended reality system 220), and can be used to generate estimates of 6DOF pose measurements of the image sensor 218 and/or the extended reality system 220. Such a SLAM technique configured to perform 6DOF tracking can be referred to as 6DOF SLAM. In some cases, the output of one or more sensors can be used to estimate, correct, and/or otherwise adjust the estimated pose.

In some cases, the 6DOF SLAM (e.g., 6DOF tracking) can associate features observed from certain input images from the image sensor 218 (and/or other camera) to the SLAM map. 6DOF SLAM can use feature point associations from an input image to determine the pose (position and orientation) of the image sensor 218 and/or extended reality system 220 for the input image. 6DOF mapping can also be performed to update the SLAM Map. In some cases, the SLAM map maintained using the 6DOF SLAM can contain 3D feature points triangulated from two or more images. For example, key frames can be selected from input images or a video stream to represent an observed scene. For every key frame, a respective 6DOF camera pose associated with the image can be determined. The pose of the image sensor 218 and/or the extended reality system 220 can be determined by projecting features from the 3D SLAM map into an image or video frame and updating the camera pose from verified 2D-3D correspondences.

In one illustrative example, the compute components 216 can extract feature points from every input image or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The features points in key frames either match (are the same or correspond to) or fail to match the features points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Speed Up Robust Features (SURF), Gradient Location-Orientation histogram (GLOH), Normalized Cross Correlation (NCC), or other suitable technique.

In some examples, AR (or virtual) objects can be registered or anchored to (e.g., positioned relative to) the detected features points in a scene. For example, the user 200 can be looking at a restaurant across the street from where the user 200 is standing. In response to identifying the restaurant and AR content associated with the restaurant, the compute components 216 can generate an AR object that provides information related to the restaurant. The compute components 216 can also detect feature points from a portion of an image that includes a sign on the restaurant, and can register the AR object to the feature points of the sign so that the AR object is displayed relative to the sign (e.g., above the sign so that it is easily identifiable by the user 200 as relating to that restaurant).

The extended reality system 220 can generate and display various AR objects for viewing by the user 200. For example, the extended reality system 220 can generate and display a virtual interface, such as a virtual keyboard, as an AR object for the user 200 to enter text and/or other characters as needed. The virtual interface can be registered to one or more physical objects in the real world. However, in many cases, there can be a lack of real-world objects with distinctive features that can be used as reference for registration purposes. For example, if a user is staring at a blank whiteboard, the whiteboard may not have any distinctive features to which the virtual keyboard can be registered. Outdoor environments may provide even less distinctive points that can be used for registering a virtual interface, for example based on the lack of points in the real world, distinctive objects being further away in the real world than when a user is indoors, the existence of many moving points in the real world, points at a distance, among others.

However, in some cases, the extended reality system 220 can make use of the hands of the user 200 for registering a virtual interface. For example, one or more hands and fingers of the user 200 can be used as the real world registration points for the virtual interface (e.g., to anchor the virtual interface in space). By registering the virtual interface to the hands and fingers the challenge of operating outdoors is reduced.

In some cases, the extended reality system 220 can also track the hand and/or fingers of the user 200 to allow the user 200 to control the virtual interface in the AR environment. For example, the extended reality system 220 can track a pose and/or movement of the hand and/or fingertips of the user 200 to identify or translate user interactions with the virtual interface. The user interactions can include, for example and without limitation, moving the virtual interface, resizing the virtual interface, selecting an input interface element in the virtual interface, providing an input through the virtual interface, etc.

In some examples, the image sensor 218 can capture images of the scene associated with the user 200, which the extended reality system 220 can use to detect objects and humans/faces in the scene. For example, the image sensor 218 can capture images of humans/faces and/or any objects in the scene, such as other devices (e.g., recording devices, displays, etc.), windows, doors, desks, tables, chairs, walls, etc. The extended reality system 220 can use the images to recognize the faces and/or objects captured by the images and estimate a relative location of such faces and/or objects. To illustrate, the extended reality system 220 can perform facial recognition to detect any faces in the scene and can use the images captured by the image sensor 218 to estimate a location of the faces within the scene. As another example, the extended reality system 220 can analyze images from the image sensor 218 to detect any capturing devices (e.g., cameras, microphones, etc.) or signs indicating the presence of capturing devices, and estimate the location of the capturing devices (or signs).

The extended reality system 220 can also use the images to detect any occlusions within a FOV of the user 200 that may be located or positioned such that any information rendered on a surface of such occlusions or within a region of such occlusions are not visible to, or are out of a FOV of, other detected users or capturing devices. For example, the extended reality system 220 can detect the palm of the hand of the user 200 is in front of, and facing, the user 200 and thus within the FOV of the user 200. The extended reality system 220 can also determine that the palm of the hand of the user 200 is outside of a FOV of other users and/or capturing devices detected in the scene, and thus the surface of the palm of the hand of the user 200 is occluded from such users and/or capturing devices. When the extended reality system 220 presents any AR content to the user 200 that the extended reality system 220 determines should be private and/or protected from being visible to the other users and/or capturing devices, such as a private control interface as described herein, the extended reality system 220 can render such AR content on the palm of the hand of the user 200 to protect the privacy of such AR content and prevent the other users and/or capturing devices from being able to see the AR content and/or interactions by the user 200 with that AR content.

Figure 3:
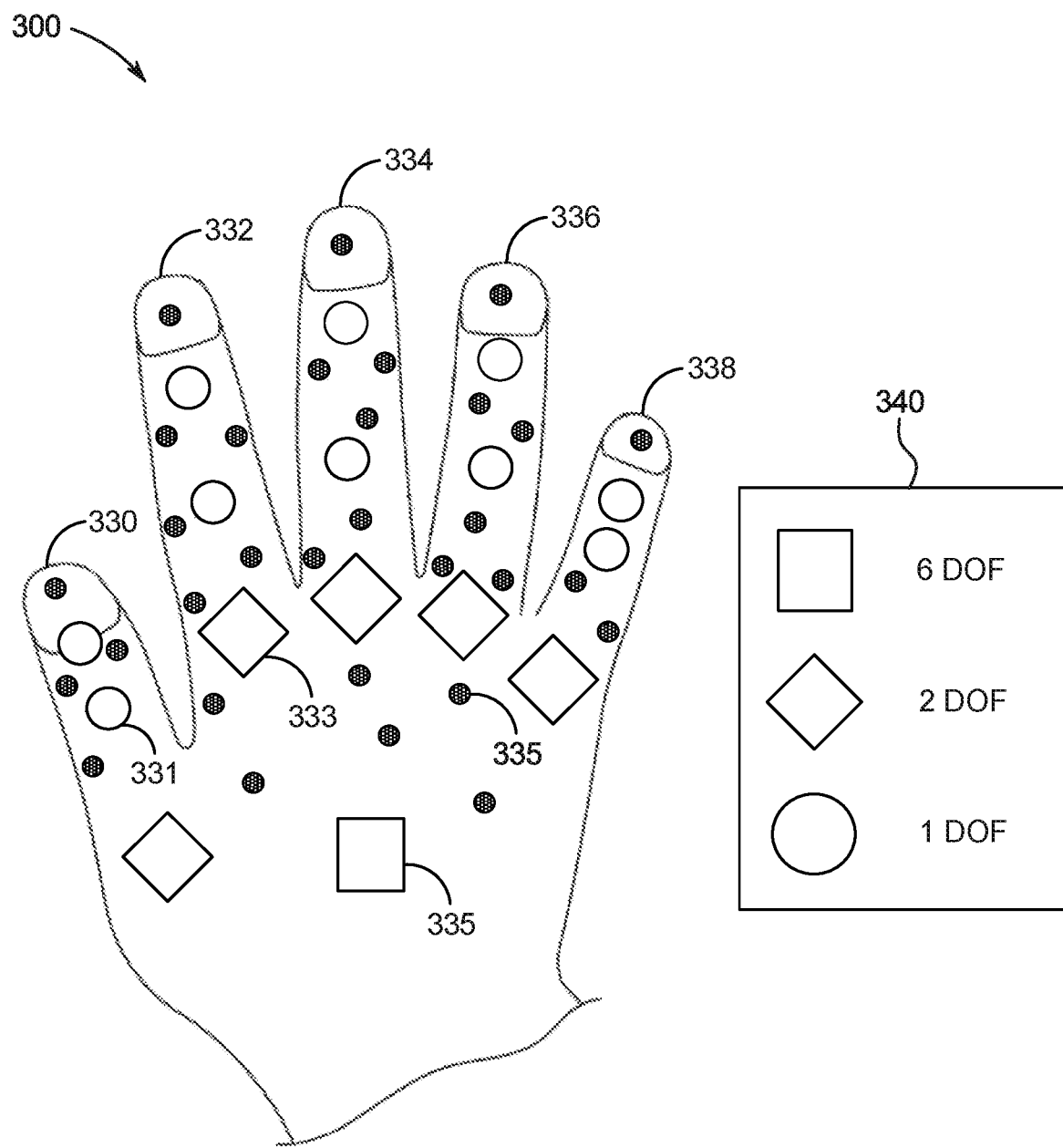
FIG. 3 is a diagram illustrating example landmark points of a hand that can be used to track positions of the hand and interactions by the hand with a virtual interface, in accordance with some examples of the present disclosure.

FIG. 3 is a diagram illustrating example landmark points of a hand 300 that can be used to track positions of the hand 300 and interactions by the hand 300 with a virtual interface, such as a private control interface as described herein. The landmark points shown in FIG. 3 correspond to different parts of the hand 300, including a landmark point 335 on the palm of the hand 300, landmark points on the thumb 330 of the hand 300, landmark points on the index finger 332 of the hand 300, landmark points on the middle finger 334 of the hand 300, landmark points on the ring finger 336 of the hand 300, and landmark points on the pinky finger 338 of the hand 300. The palm of the hand 300 can move in three translational directions (e.g., measured in X, Y, and Z directions relative to a plane, such as an image plane) and in three rotational directions (e.g., measured in yaw, pitch, and roll relative to the plane), and thus provides six degrees of freedom (6DOF) that can be used for registration and/or tracking. The 6DOF movement of the palm is illustrated as a square in FIG. 3, as indicated in the legend 340.

The different joints of the fingers of the hand 300 allow for different degrees of movement, as illustrated in the legend 340. As illustrated by the diamond shapes (e.g., diamond 333) in FIG. 3, the base of each finger (corresponding to the metacarpophalangeal joint (MCP) between the proximal phalanx and the metacarpal) has two degrees of freedom (2DOF) corresponding to flexion and extension as well as abduction and adduction. As illustrated by the circle shapes (e.g., circle 331) in FIG. 3, each of the upper joints of each finger (corresponding to the interphalangeal joints between the distal, middle, and proximal phalanges) has one degree of freedom (2DOF) corresponding flexion and extension. As a result, the hand 300 provides 26 degrees of freedom (26DOF) from which to track the hand 300 and interactions by the hand 300 with a virtual interface rendered by the extended reality system 100.

The extended reality system 100 can use one or more of the landmark points on the hand 300 to track the hand 300 (e.g., track a pose and/or movement of the hand 300) and track interactions with a virtual interface rendered by the extended reality system 100. As noted above, as a result of the detection of the one or more landmark points on the hand 300, the pose of the landmarks (and thus the hand and fingers) in relative physical position with respect to the extended reality system 100 can be established. For example, the landmark points on the palms of the hand 300 (e.g., the landmark point 335) can be detected in an image, and the locations of the landmark points can be determined with respect to the image sensor 102 of the extended reality system 100. A point of a virtual interface (e.g., a center point, such as a center of mass or other center point) rendered by the extended reality system 100 and/or an interface element on the virtual interface selected by the hand 300, or with which the hand 300 has interacted, can be translated to a position on the display 210 (or a rendering on the display 210) of the extended reality system 100 relative to the locations determined for the landmark points on the palms of the hand 300. In some examples, a point of a portion of the virtual interface with which the hand 300 has interacted with can be registered relative to locations of one or more landmark points on the hand 300.

In some examples, the extended reality system 100 can also register the virtual interface and/or the hand 300 to points in the real world (as detected in one or more images) and/or to other parts of the user. For instance, in some implementations, in addition to determining a physical pose of the hand 300 with respect to the extended reality system 100 and/or a virtual interface, the extended reality system 100 can determine the location of other landmarks, such as distinctive points (referred to as key points) on walls, one or more corners of objects, features on a floor, points on a human face, points on nearby devices, among others. In some cases, the extended reality system 100 can place the virtual interface within a certain position with respect to key points detected in the environment, which can correspond to, for example, detected objects and/or humans in the environment.

In some examples, the pose of the extended reality system 100 (and/or the head of the user 200) can be determined using, for example, image data from the image sensor 102 and/or measurements from one or more sensors such the accelerometer 104, the gyroscope 106, and/or one or more other sensors (e.g., one or more magnetometers, one or more inertial measurement units (IMUs), etc.). The head pose can be used to determine a position of the virtual interface, the hand 300, and/or objects and/or humans in the environment.

In some examples, the virtual interface can be maintained at a rendered position. The user can then virtually interact with the virtual interface as the virtual interface is rendered at the determined position. For example, the virtual interface can be maintained at a rendered position and the user can virtually enter text through the virtual interface. In some cases, the virtual interface can stay fixed as the user interacts with the virtual interface. In some cases, the virtual interface can be maintained at the determined position until a re-registration event is detected by the extended reality system 100. If the virtual interface is a private control interface, the extended reality system 100 can move, remove, or reconfigure the virtual interface if it detects an event indicating that the virtual interface may now be within a FOV of another user or a risk object, which can include any object that can record the virtual interface (and/or associated interactions) or enable users to see the virtual interface from or through the risk object such as a recording device, a window, a glass, a door, etc. For example, the extended reality system 100 can move the virtual interface to a different location that the extended reality system 100 determines is outside of the FOV of the other user or risk object. If the extended reality system 100 determines that there are no other locations (or is unable to identify other locations) that are within a FOV of the user 200 but outside of the FOV of the other user or risk object, the extended reality system 100 can simply remove the virtual interface, notify the user that the virtual interface is no longer private, and/or prompt the user to select whether to leave the virtual interface where currently rendered, move the virtual interface to a different location, remove the virtual interface, or perform another action.

Figure 4:
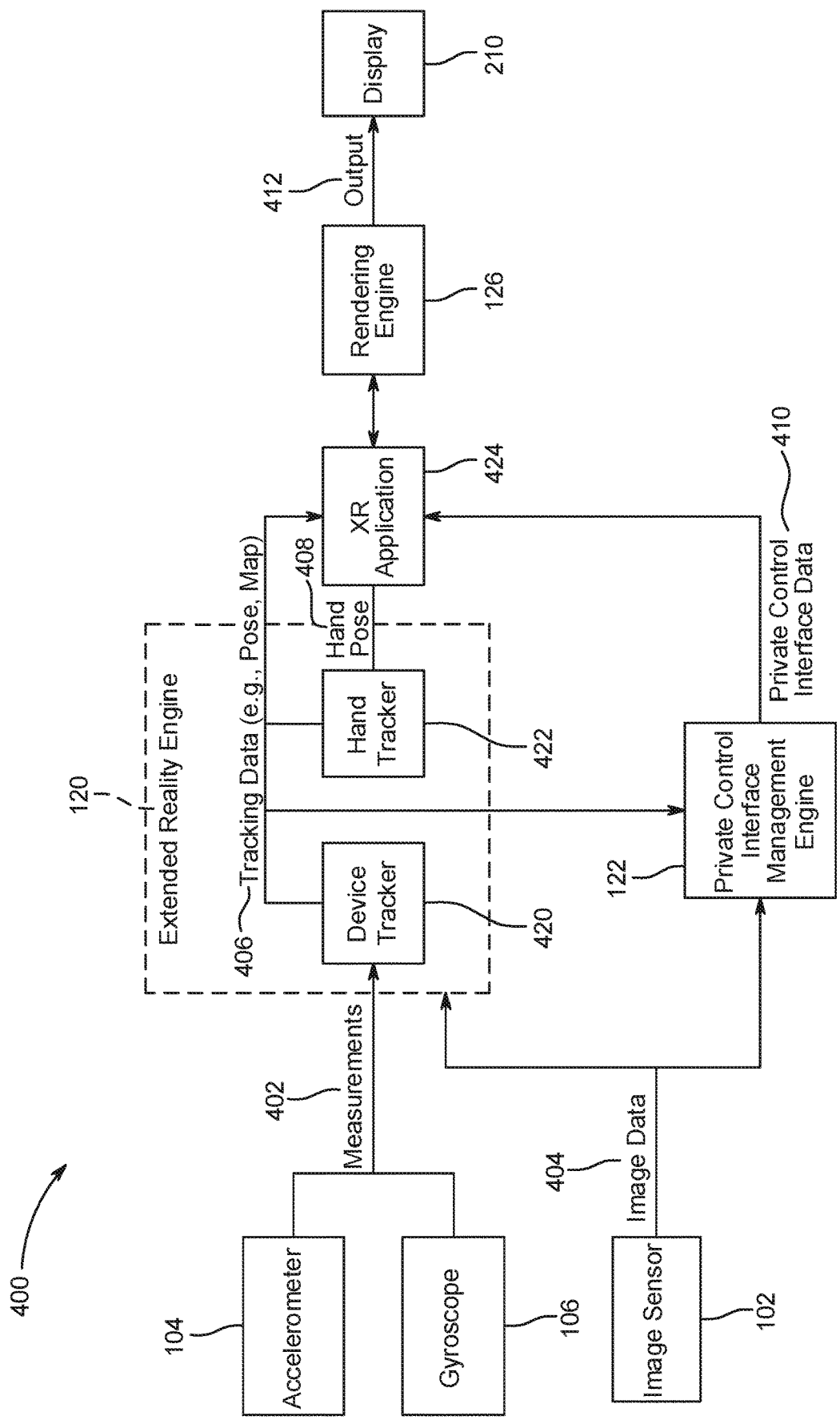
FIG. 4 is a diagram illustrating an example system flow for generating private control interfaces for extended reality experiences, in accordance with some examples of the present disclosure.

FIG. 4 is a diagram illustrating an example system flow 400 for generating private control interfaces for XR experiences. The private control interfaces can be generated to allow a user to interact with a control interface while preventing other users and recording devices from seeing the control interface or the user's interactions with the control interface, and interpreting such interactions to ascertain the meaning of such interactions and the data associated with such interactions.

In this example, a device tracker 420 can receive measurements 402 from accelerometer 104 and gyroscope 106, and image data 404 from image sensor 102. In some examples, the measurements 402 can include motion measurements from the accelerometer 104 and orientation measurements from the gyroscope 106. For example, the measurements 402 can include one or more translational vectors (e.g., up/down, left/right, forward/back) from the accelerometer 104 and one or more rotational vectors (e.g., pitch, yaw, roll) from the gyroscope 106. Moreover, the image data 404 can include one or more images or frames captured by the image sensor 102. The one or more images or frames can capture a scene associated with the extended reality system 100 and/or one or more portions of the scene (e.g., one or more regions, objects, humans, etc.).

The device tracker 420 can be a tracking component implemented by the extended reality system 100. In some examples, the device tracker 420 can be part of, or implemented by, the XR engine 120 on the extended reality system 100. In other examples, the device tracker 420 can be separate from the XR engine 120 and implemented by one or more of the compute components 110 on the extended reality system 100.

The device tracker 420 can use the measurements 402 and image data 404 to track a pose (e.g., a 6DOF pose) of the extended reality system 100. For example, the device tracker 420 can fuse visual data from the image data 404 with inertial data from the measurements 402 to determine a position and motion of the extended reality system 100 relative to the physical world (e.g., the scene) and a map of the physical world. In some examples, when tracking the pose of the extended reality system 100, the device tracker 420 can generate a three-dimensional (3D) map of the scene (e.g., the real world) and/or generate updates for a 3D map of the scene. The 3D map updates can include, for example and without limitation, new or updated features and/or landmark points associated with the scene and/or the 3D map of the scene, localization updates identifying or updating a position of the extended reality system 100 within the scene and the 3D map of the scene, etc. The 3D map can provide a digital representation of a scene in the real/physical world. In some examples, the 3D map can anchor location-based objects and/or content to real-world coordinates and/or objects. The extended reality system 100 can use a mapped scene (e.g., a scene in the physical world represented by, and/or associated with, a 3D map) to merge the physical and virtual worlds and/or merge virtual content or objects with the physical environment.

The device tracker 420 can provide tracking data 406 generated from the measurements 402 and the image data 404 to a hand tracker 422, an XR application 424, and the private control interface management engine 122. The tracking data 406 can include the pose of the extended reality system 100 and map data calculated by the device tracker

420. The map data can include a 3D map of the scene and/or map updates for a 3D map of the scene, as previously described.

The hand tracker 422 can be a component implemented by the extended reality system 100 to track a hand (e.g., the hand 300 of FIG. 3) of the user (e.g., the user 200 of FIG. 2) associated with the extended reality system 100 and/or fingertips in the hand of the user, as previously explained. For simplicity and explanation purposes, the hand tracker 422 will be described herein as a component for tracking hands. However, it should be noted that, in other examples, the hand tracker 422 can track other objects and/or body parts. For example, as previously noted, the hand tracker 422 can track fingers or fingertips on a hand either in addition to, or instead of, tracking the hand itself.

In some examples, the device tracker 420 can be part of, or implemented by, the XR engine 120 on the extended reality system 100. In other examples, the device tracker 420 can be separate from the XR engine 120 and implemented by one or more of the compute components 110 on the extended reality system 100.

The hand tracker 422 can also receive the image data 404 from the image sensor 102. The hand tracker 422 can use the image data 404 and the tracking data 406 to track a hand pose 408 (e.g., a pose of the hand and/or fingers/fingertips of the hand). In some examples, the hand tracker 422 can determine the hand pose 408 as previously described with respect to FIG. 3. The hand tracker 422 can then provide the hand pose 408 to the XR application 424. In some examples, the XR application 424 can be an application on the extended reality system 100 designed and/or configured to provide a particular XR experience, such as, for example, an AR gaming experience, an AR classroom experience, and/or any other XR experiences. The XR application 424 can be part of, or implemented by, the XR engine 120 or can be separate from the XR engine 120.

The private control interface management engine 122 can use the image data 404 and the tracking data 406 to determine when, how, and/or where to render a private control interface as part of an XR experience. The private control interface can be a virtual control interface designed and/or configured to hide the control interface, interactions between the control interface, and/or data inputs/outputs associated with the control interface from any users and/or recording devices in a scene that are not authorized to see such information, and/or all users and/or recording devices in the scene other than the intended user associated with the extended reality system 100.

In some examples, the private control interface management engine 122 can determine whether a virtual control interface should be rendered as a private control interface in order to hide the virtual control interface and associated interactions/data from users and/or recording devices in the scene. The private control interface management engine 122 can determine whether to render the virtual control interface as a private control interface based on one or more factors, such as, for example, user preferences, system preferences, application preferences, the type of interface of the virtual control interface (e.g., a password prompt, a pin pad, a medical form, an exam or quiz question, a voting poll, a banking interface, a private form, a competitive game control interface, etc.), the type of data inputs/outputs associated with the virtual interface (e.g., medical data, financial data, authentication credentials, confidential data, personal or private data, protected data, security information, sensitive data, etc.), security information or access levels associated with the virtual interface and/or associated data, the type of application associated with the virtual interface (e.g., banking, medical, security, gaming, etc.), the current environment associated with the extended reality system 100 (e.g., public area, surveilled area, high-crime area, populated area, area with nearby users or devices, etc.), and/or any other factors.

In some cases, the private control interface management engine 122 can identify a private region in the scene where the private control interface can be rendered. The private region can include a region, area, location, object, surface, and/or plane in the scene that is within the FOV of the user associated with the extended reality system 100 but outside of a FOV of other users and/or any known or potential recording devices in the scene. In other words, the private region can be somewhere in the scene that the user can see but other users and/or recording devices in the scene cannot see. In some cases, the private region can be determined to be outside of a FOV of other users and/or recording devices if an occlusion in the scene can prevent (e.g., block) the other users and/or recording devices from seeing the private region.

For example, a stack of books on a table may block other users and/or recording devices in a scene from seeing an area of the table on a specific side of the stack of books (e.g., an opposite side relative to the other users and/or recording devices). If that area of the table is not occluded from the user (e.g., is within a FOV of the user) associated with the extended reality system 100, the stack of books can be deemed an occlusion and the area of the table can be treated as a private region which can be used to render the private control interface for the user without exposing the private control interface and/or associated interactions/data to the other users and/or recording devices in the scene.

In some examples, to identify a private region in the scene, the private control interface management engine 122 can use the image data 404 to identify any objects and faces in the scene and their associated location in the scene relative to the extended reality system 100. The objects can include risk objects. Risk objects can include any devices with recording capabilities, such as a camera, or anything that would allow other users to see the private region, such as a window, an open or glass door, etc. In some cases, the private control interface management engine 122 can use the information about the objects and/or faces in the scene and their associated locations within the scene to determine whether any region, area, location, object, surface, and/or plane in the scene can be selected as a private region that is outside of a FOV of the other users and/or risk objects but within a FOV of the user associated with the extended reality system 100. For example, the private control interface management engine 122 can determine if there is any area or plane in the scene within a relative location, angle, distance, etc., that would prevent the other users and/or risk objects from seeing that area or plane.

In some cases, the private control interface management engine 122 can identify any objects and faces in the scene (and their associated location) based on inputs from the user and/or other devices. For example, the user can input information about any users and objects in the scene, including, for example, a description of such users and objects, a description of the location of such users and objects, an indication of possible occlusions and/or private regions, etc. As another example, such information can be self-reported from other devices in the scene. If such devices are trusted, the private control interface management engine 122 can rely on such information when identifying objects, faces, and associated locations.

In some cases, the private control interface management engine 122 can perform an occlusion calculation to determine whether there are any occlusions that would prevent other users and/or risk objects in the scene from seeing a particular region, area, location, object, surface, and/or plane in the scene. For example, the private control interface management engine 122 can determine whether there are any regions in the mapped scene (e.g., a scene in the physical world represented by, and/or associated with, a 3D map) that are occluded from all but the user associated by the extended reality system 100. In some examples, the private control interface management engine 122 can use ray tracing to find occlusions and/or regions in the scene occluded from other users and/or risk objects. In other examples, the private control interface management engine 122 can analyze the image data 404 to determine whether there are any occlusions in the scene that may prevent other users and/or risk objects from seeing a particular region in the scene. The occlusions can include any objects or obstructions to the FOV of other users and/or risk objects in the scene. Moreover, the occlusions can be used to identify a private region that can be used to render the private control interface for the user.

In some examples, the private control interface management engine 122 may infer or assume that a surface in the scene is a private region if that surface faces the user associated with the extended reality system 100 within a particular angle. For example, the private control interface management engine 122 can identify planar surfaces in the scene which face the user to within a programmable angle, and infer or assume that such planar surfaces are private. The programmable angle can be, for example, an angle within a threshold difference or distance (e.g., angular) from an angle or orientation of the face of the user. For example, if the face of the user is at a 90 degree angle, the programmable angle can be a 90 degree angle or an angle within x degrees from 90 degrees. In some cases, the private control interface management engine 122 can use plane segmentation (e.g., via random sample consensus (RANSAC), Hough transform, neural network, etc.) on the mapped scene to find the planar surfaces facing the user within a programmable angle. In some examples, the private control interface management engine 122 can analyze detected objects, faces, and/or occlusions, as previously described, to confirm that the planar surface is indeed private.

In some cases, when the private control interface management engine 122 identifies a private region, the private control interface management engine 122 can also determine a configuration (e.g., size, shape, angle, distance, etc.) of the private region and/or a configuration (e.g., size, shape angle, design, scheme, etc.) of the private control interface to fit and/or align the private control interface on or within the private region. For example, the private control interface management engine 122 can determine a size and shape of the private region and select a size, shape, and/or design for the private control interface to ensure the private control interface fits in the private region and can be aligned with the private region.

Next, the private control interface management engine 122 can provide private control interface data 410 to the XR application 424. The private control interface data 410 can include an indication of a private region that the XR application 424 can use to render a private control interface. In some examples, the private control interface data 410 can include an indication of a location and configuration (e.g., shape, size, angle, etc.) of the private region. In some examples, the private control interface data 410 can also include configuration information for the private region. The configuration information can include, for example, a size, shape, design, interface type or scheme, layout, alignment, and/or any other characteristic that the XR application 424 can use to render, fit, align, and/or lock the private control interface on the private region.

As previously explained, the XR application 424 can also receive the tracking data 406 from the device tracker 420 and the hand pose 408 from the hand tracker 422. The XR application 424 can use the tracking data 406 and the hand pose 408 along with the private control interface data 410 to size, position, align, and render the private control interface on the private region. The rendering of the private control interface on the private region can include providing a virtual/digital overlay of the private control interface on the private region and/or rendering/displaying the private control interface to appear to a user viewing the private control interface from/through the extended reality system 100 as if located, presented, or projected on the private region. In some cases, the XR application 424 can use the tracking data 406, the hand pose 408, and the private control interface data 410 to map the private control interface to the private region on a 3D map of the scene. Moreover, in some cases, the XR application 424 can use the tracking data 406, the hand pose 408, and the private control interface data 410 to map and/or translate user interactions (e.g., via the hand) with the private control interface and/or otherwise allow the private control interface to interact with the user.

The XR application 424 can provide an output 412 to a display 210, which can present the private control interface to the user. The output 412 can include a rendering of the private control interface within the private region. For example, the output 412 can include a virtual/digital overlay of the private control interface on (e.g., rendered on, appearing on, anchored to, locked on, etc.) the private region. In some cases, the output 412 can include rendering/displaying the private control interface to appear to a user viewing the private control interface from/through the extended reality system 100 as if the private control interface is located, presented, or projected on the private region. In some cases, the output 412 can include other information associated with the private control interface and/or XR content provided by the XR application 424.

Figure 5:
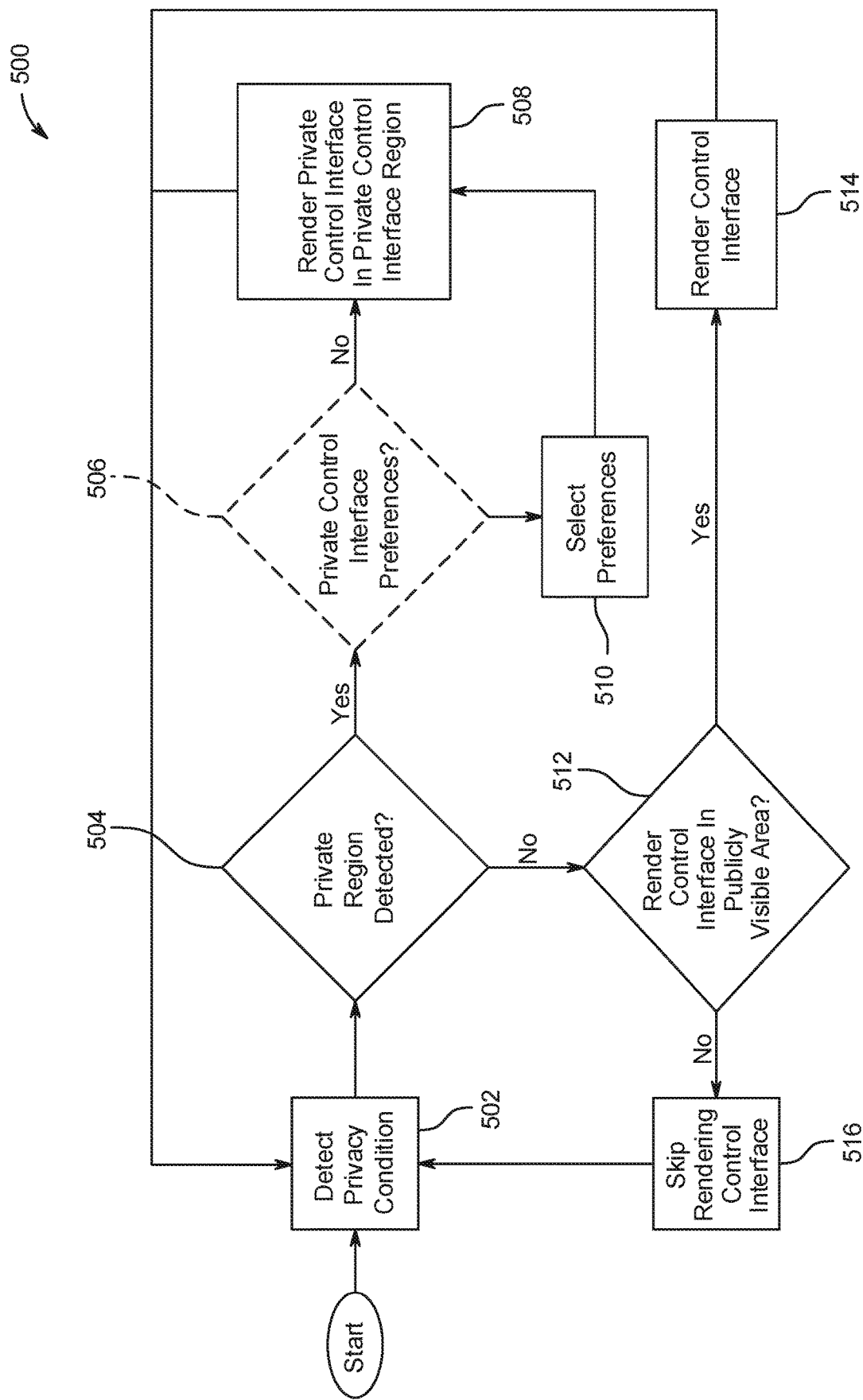
FIG. 5 is a flow diagram illustrating an example process for generating private control interfaces for extended reality experiences, in accordance with some examples of the present disclosure.

FIG. 5 is a flow diagram illustrating an example process 500 for generating private control interfaces for XR experiences. The operations outlined herein are non-limiting examples provided for illustration purposes, and can be implemented in any combination thereof, including combinations that exclude, add, or modify certain operations or steps. Moreover, for the sake of simplicity and explanation purposes, the operations are described with reference to the extended reality system 100, as shown in FIG. 1, configured to practice the operations of the process 500.

At block 502, the extended reality system 100 can first detect a privacy condition. The privacy condition can be any event and/or condition configured to trigger rendering of a private control interface. For example, the privacy condition can be any event and/or condition that triggers the extended reality system 100 to present a virtual interface in a private mode (e.g., on a private region) to prevent other users or devices from having visible access to the virtual interface, user interactions with the virtual interface, and/or data associated with the virtual interface.

In some examples, the privacy condition can be defined based on one or more factors. For example, the privacy condition can be defined by, or based on, user preferences, system preferences (e.g., preferences from extended reality system 100), application preferences (e.g., preferences from XR application 424), application and/or content terms, laws or regulations, best practices, security norms, potential security implications, type of XR application, rules regarding conditions in the environment (e.g., whether the environment is accessible to the public, whether there are other users or devices in the environment, whether it is a populated area, whether there are any privacy expectations, etc.), the type of data associated the XR application and/or the virtual interface (e.g., personal user data, authentication data (passwords, pins, codes, etc.), medical information, financial information, player information in multi-user games, security information, password-protected data, data protected by access control lists (ACLs) and/or permissions, user account data, privileged or confidential data, etc.

At block 504, the extended reality system 100 can determine if a private region has been detected. The extended reality system 100 can detect the private region as previously explained with respect to FIG. 4. Moreover, the private region can be a location, area, region, plane, object, and/or surface that is visible only to the user associated with the extended reality system 100 (e.g., not visible to other users or recording devices), which the extended reality system 100 can use to render the private control interface. In some cases, the extended reality system 100 can make exceptions for certain, predetermined users, devices, and/or objects, such that the extended reality system 100 may treat a region as a private region even if visible to such users, devices, and/or objects. For example, in a multi-game scenario, if the user associated with the extended reality system 100 is playing on a team that includes another user in the scene, that other user may be permitted to see the private control interface. Accordingly, when identifying a private region, the extended reality system 100 may ignore the fact that the other user can see that private region and nevertheless select that region as a private region for rendering the private control interface.

If at block 504 the extended reality system 100 detects a private region, at block 508 the extended reality system 100 can render the private control interface on the private region. In some cases, if the extended reality system 100 detects multiple private regions, the extended reality system 100 can select a specific private region and/or prioritize private regions. The extended reality system 100 can select/prioritize private regions based on one or more factors. For example, the extended reality system 100 can select/prioritize private regions based on user preferences, characteristics associated with the private regions (e.g., shape, size, angle, location, relative distance, location relative to a FOV of the user and/or other users/devices, movement (or lack thereof) associated with the private regions, etc.), confidence levels that the private regions are outside of a FOV of other users and/or risk objects, type of private region (e.g., body part of the user, a surface on an object, a plane facing the user within an angle, etc.), number and/or type of occlusions blocking visibility by other users and/or risk objects (e.g., larger objects or objects with greater blocking capabilities can be given higher priorities/weights), type of data used to identify the private regions (e.g., self-reported data from other devices, data reported by the user, object detection data, plane segmentation data, image data, occlusion data, biometric data, etc.), occlusion calculation confidence levels, etc.

In some cases, before rendering the private control interface on the private region, at block 506 the extended reality system 100 can optionally determine whether there are any private control interface preferences set. The private control interface preferences can include, for example and without limitation, preferences for the configuration of the private control interface (e.g., the shape, the size, the design, the scheme, the layout, the rendering height, the depth, etc.), preferences for whether the virtual interface should be rendered as a private control interface, timing preferences, rendering preferences, preferences for whether to lock the private control interface on the private region or allow the private control interface to be dismissed/removed after a certain period or event, preferences for how to manage the private control interface if movement is detected with respect to the private control interface or surrounding environment (e.g., the private region, objects in the scene, users in the scene, occlusions, the user, etc.), privacy levels, private region selection and/or prioritization preferences (e.g., if multiple private regions are detected), and/or any other preferences.

If the extended reality system 100 identifies any private control interface preferences, at block 510 the extended reality system 100 can select such private control interface preferences and use such preferences to render the private control interface on the private region at block 508.

Returning to block 504, if the extended reality system 100 does not detect a private region, at block 512 the extended reality system 100 can determine whether to render the control interface in a publicly visible area. The publicly visible area can include any area or region that may be visible to other users and/or risk objects such as recording devices, windows, glass doors, etc. In some cases, the extended reality system 100 can prompt the user to select whether to render the control interface in a publicly visible area or not. In other cases, the extended reality system 100 can determine whether to render the control interface in a publicly visible area based on predefined rules and/or preferences for how to proceed when a private region is not found. The predefined rules and/or preferences can include, for example, user preferences, rules based on the type of data and/or application associated with the control interface, security levels, one or more conditions associated with the scene (e.g., expectation of privacy, number of users and/or devices in the scene, type of area associated with the scene, etc.), one or more risk factors, urgency of rendering the control interface and/or flexibility to delay rendering the control interface, and/or any other rules or preferences.

At block 514, if the extended reality system 100 determines to render the control interface in a publicly visible area, the extended reality system 100 can proceed to render the control interface in a particular region within the scene even if such region is potentially visible to other users and/or risk objects. Alternatively, if the extended reality system 100 determines not to render the control interface in a publicly visible area, at block 516 the extended reality system 100 can skip rendering the control interface. The extended reality system 100 can skip rendering the control interface altogether or can delay the rendering for a specific period of time or until a specific event occurs. For example, the extended reality system 100 can delay rendering the control interface until it receives a request from the user to render the control interface or until a certain amount of time lapses.

In some cases, when a certain amount of time lapses, the extended reality system 100 can return to block 504 to determine whether it can detect a private region. In some examples, after a certain period of time, the extended reality system 100 can also or alternatively ask the user whether to render the control interface in a publicly visible area and/or continue trying to find a private region for rendering the control interface.

Figure 6A:
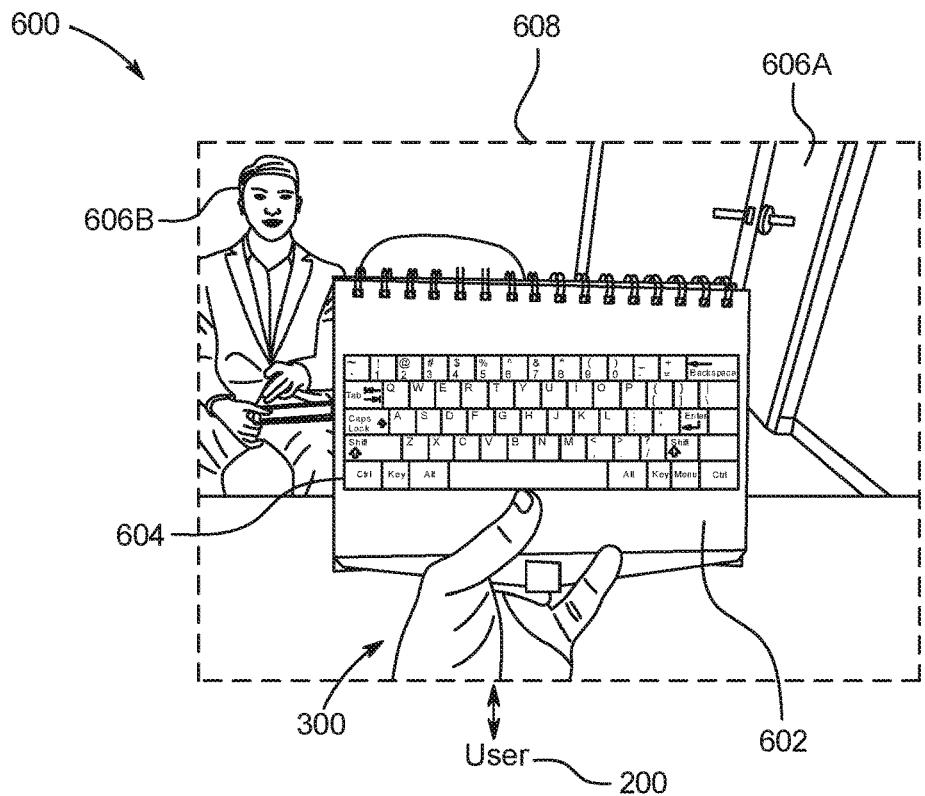
FIG. 6A through FIG. 6D are diagrams illustrating examples of private control interface renderings, in accordance with some examples of the present disclosure.

FIG. 6A illustrates an example private control interface rendering 600. Here, the extended reality system 100 has detected a private region 602 that is visible to the user 200 associated with the extended reality system 100, but not otherwise visible to other users and/or risk objects (e.g., recording devices, windows, glass doors, etc.). In this example, the private region 602 is a surface on a notebook held by the user 200 using the user's hand 300. The surface of the notebook is facing the user 200 and facing away from an open door 606A and another user 606B in the scene 608. Accordingly, the surface of the notebook (e.g., the private region 602) is not visible from the open door 606A or within a FOV of the other user 606B.

The scene 608 can be a physical environment (e.g., in the real/physical world), setting, and/or surroundings around the user 200 and the extended reality system 100. For example, the scene 608 can be an office, room, hall, garage, street, field, walkway, elevator, and/or any other physical space in the real/physical world, where the user 200 and extended reality system 100 are located (and/or around/surrounding the user 200 and extended reality system 100).

In some examples, the extended reality system 100 can verify that the private region 602 is not visible to other users and/or risk objects behind the user 200. For example, the extended reality system 100 can use rear-facing image sensors and/or a user body model to determine whether the private region 602 is visible to other users and/or risk objects behind the user 200.

Since the extended reality system 100 detected a private region 602 in the scene 608, the extended reality system 100 can render a private control interface 604 on the private region 602. In this example, the private control interface 604 is a virtual keyboard. The user 200 can use the virtual keyboard to provide inputs to the XR application (e.g., 424) for the XR experience associated with the virtual keyboard. The private control interface 604 can remain locked on the private region 602 or can be removed once the user 200 has completed using the private control interface 604, the private control interface 604 is no longer needed for the XR application, the private control interface 604 has timed out, the user 200 moves the notebook (e.g., private region 602), or another user moves and the private region 602 becomes visible to that user.

Figure 6B:
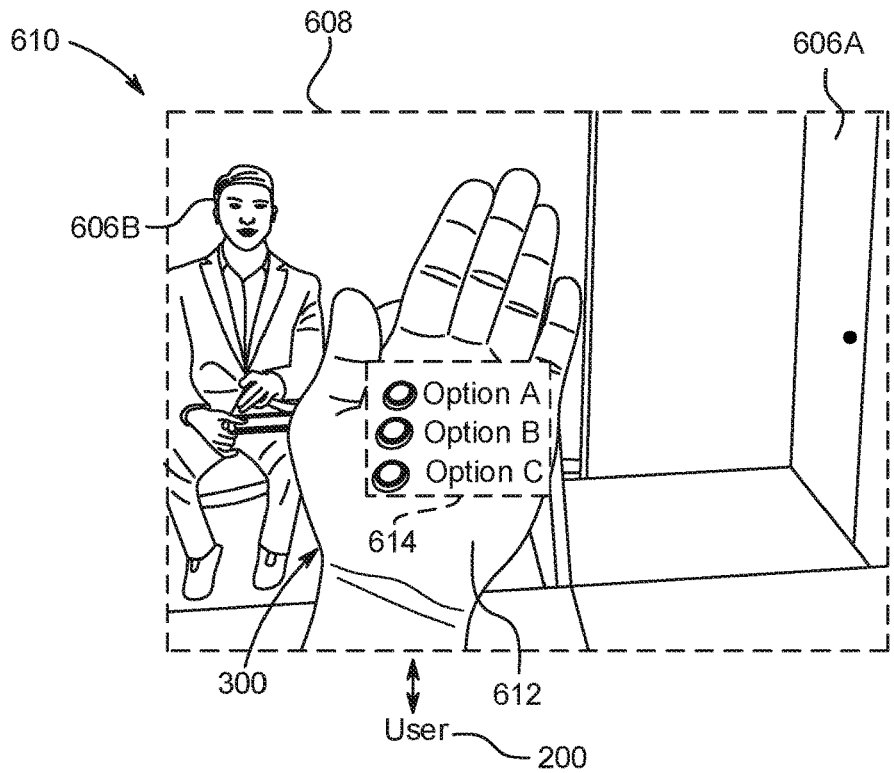

FIG. 6B illustrates another example private control interface rendering 610. In this example, the extended reality system 100 has used a surface of the palm of the hand 300 of the user 200 as the private region 612 for rendering a private control interface 614. The palm of the hand 300 of the user 200 is facing the user 200 and away from the open door 606A and the other user 606B in the scene 608. Accordingly, the palm of the hand 300 of the user 200 is visible to the user 200 but not visible from the open door 606A or to the other user 606B.

In some examples, before using the palm of a hand (or any other body part) of a user as a private region, the extended reality system 100 can use biometric data to confirm that the palm is the user's palm. For example, the extended reality system 100 can determine if the palm biometrics are recognized (e.g., match a previously-registered biometric associated with the user). If the palm biometrics are recognized/verified, the extended reality system 100 can render the private control interface 614 on the palm. Otherwise, the extended reality system 100 may select not to render the private control interface 614 on the palm. This can provide an additional security measure to ensure that private control interfaces are not rendered on other users' hands or body parts.

The private control interface 614 in this example includes option buttons. Thus, the private control interface 614 in FIG. 6B differs from the private control interface 604 in FIG. 6A. The private control interface 614 can be different for one or more reasons. For example, the private control interface 614 can differ because the type of data/inputs requested/expected are different. To illustrate, if the user needs to enter text, the private control interface rendered can be a keyboard. On the other hand, if the user does not need to enter text but rather needs to select an option, the private control interface rendered can be an interface of option buttons as illustrated in FIG. 6B.

As another example, the private control interface 614 can differ because of rendering requirements, such as the size of the private region (e.g., a smaller private region can trigger a smaller interface or a different interface design/scheme that better fits within the smaller region), the shape of the private region, user preferences, etc.

Figure 6C:
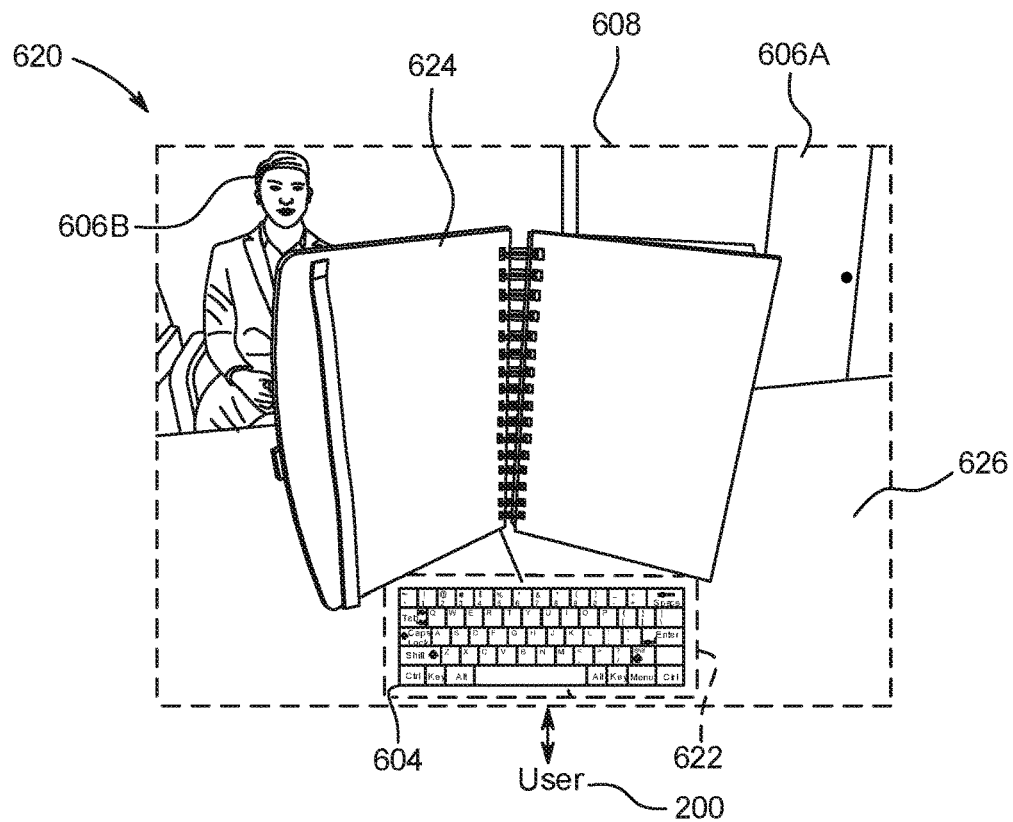

FIG. 6C illustrates another example private control interface rendering 620. In this example, the private region 622 is a flat surface on a desk 626. The private region 622 is within a FOV of the user 200. However, an occlusion 624 on the desk 626 is blocking visibility to the private region 622 from the open door 606A. The occlusion 624 is also blocking the visibility to the private region 622 by the other user 606B. Therefore, the private region 622 is visible to the user 200 but not visible from the door 606A or to the other user 606B.

The occlusion 624 in this example is a notebook standing on the desk 626 and occluding the flat surface of the desk 626 corresponding to the private region 622. Moreover, the extended reality system 100 has rendered a private control interface 604 on the private region 622, as the private region 622 is occluded from the open door 606A and the other user 606B by the notebook (e.g., the occlusion 624) on the desk 626. The user 200 can interact with the private control interface 604 rendered on the private region 622 without exposing such interactions and/or associated data to the other user 606B or to any users or recording devices that may be outside of the open door 606A.

Figure 6D:
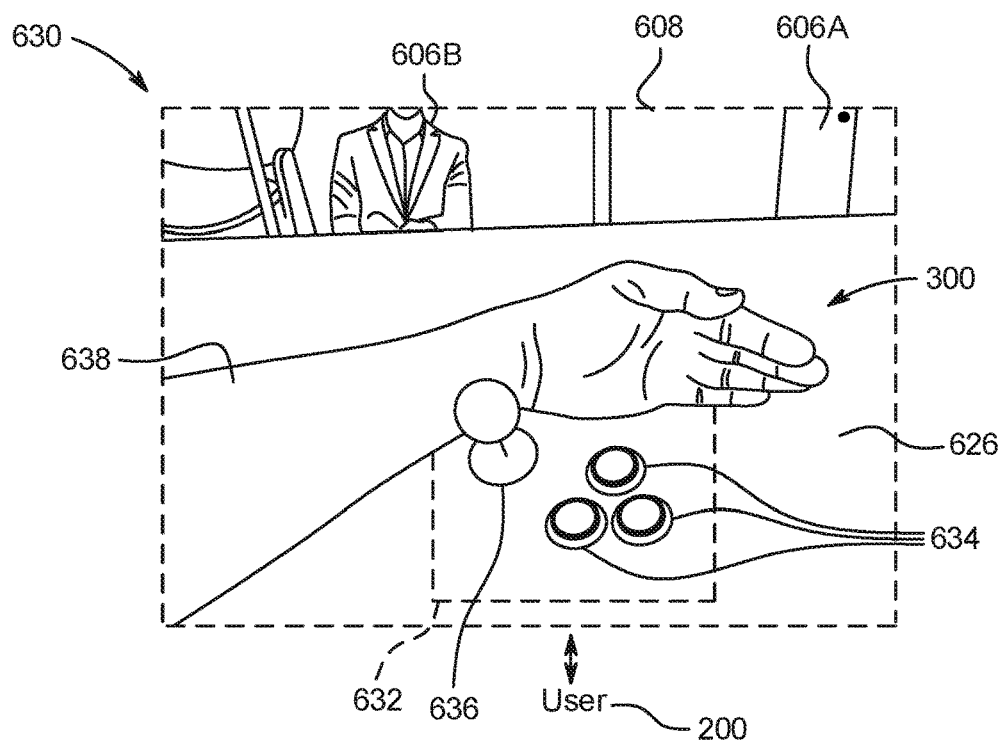

FIG. 6D illustrates another example private control interface rendering 630. In this example, the private region 632 is on a flat surface of the desk 626, but is occluded by the hand 300 and arm 638 of the user 200. The private region 632 is facing the user 200 and the occlusion (e.g., the hand 300 and arm 638) is not blocking the user's visibility to the private region 632. However, the visibility to the private region 632 from the open door 606A or by the other user 606B is blocked by the hand 300 and arm 638 of the user 200. Thus, the private region 632 is within a FOV of the user 200 but outside of a FOV from the open door 606A or by the user 606B.

The private control interface in this example includes a joystick 636 and buttons 634. The joystick 636 and buttons 634 are rendered on the private region 632. Since the private region 632 is a flat horizontal surface, the joystick 636 and buttons 634 can be easier to use when rendered on the private region 632, as opposed to when the private region is a vertical surface as shown in FIGS. 6A-B. Accordingly, the extended reality system 100 can select or prioritize the joystick 636 and buttons 634 as an interface design/scheme for use in this example rendering 630. However, in other examples where the private region is a vertical surface as shown in FIGS. 6A-B, the extended reality system 100 may instead select or prioritize a different interface design/scheme that may be easier to use on a vertical surface, such as a virtual keyboard or option button for example.

Figure 7:
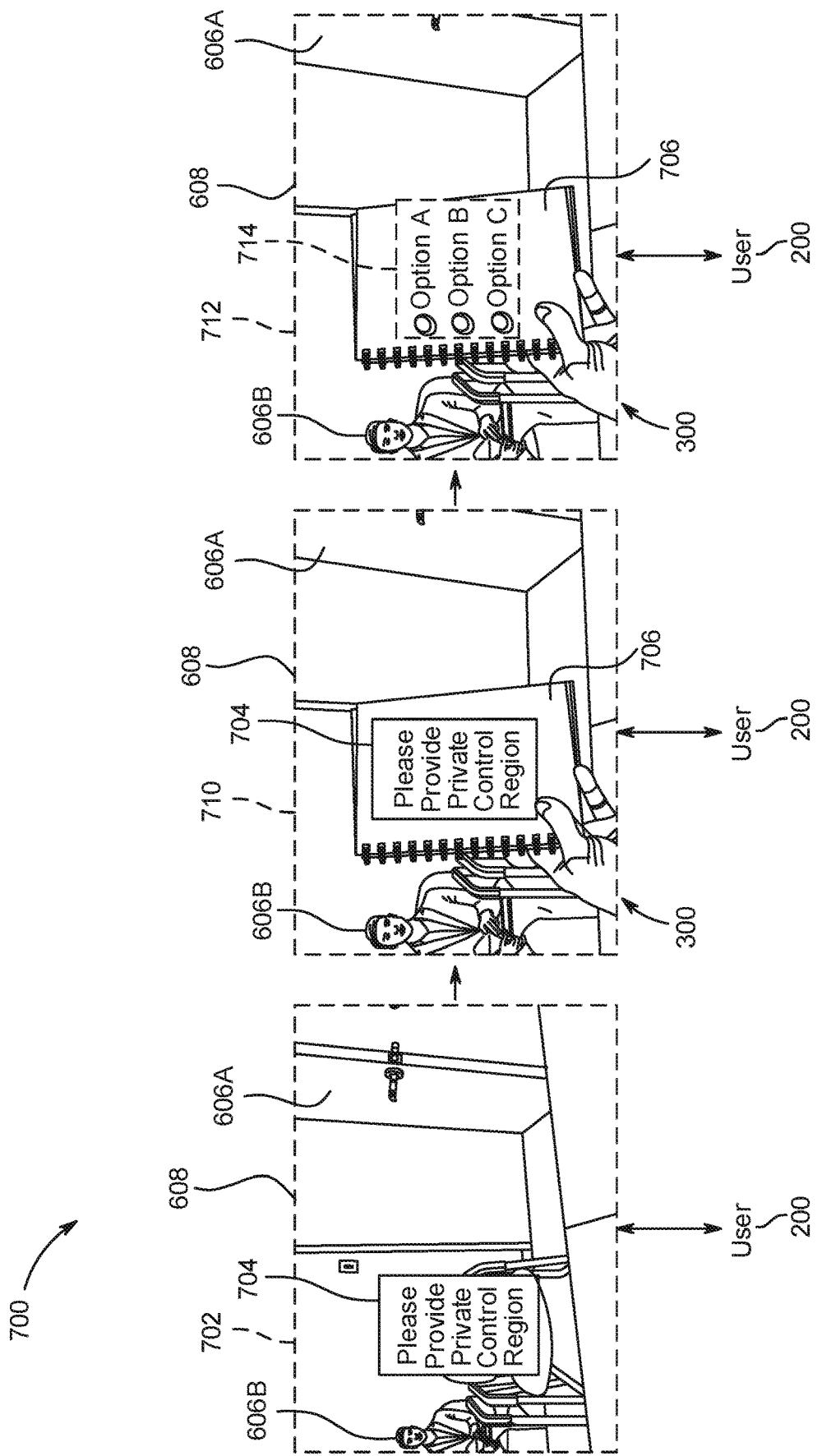
FIG. 7 is a diagram illustrating an example rendering flow for requesting rendering preferences from a user and rendering a private control interface based on preferences received from the user, in accordance with some examples of the present disclosure.

FIG. 7 illustrates an example rendering flow 700 for requesting rendering preferences from a user 200 and rendering a private control interface based on preferences received from the user 200. In the first view 702 of the flow 700, when the extended reality system 100 needs to render a control interface that the extended reality system 100 determines should be private, the extended reality system 100 can render a prompt 704 to the user 200 asking the user 200 to provide a private control region on which to render the control interface.

In some cases, the prompt 704 can include or represent a placeholder box for the private control interface. In some examples, the placeholder box (e.g., the prompt 704) can be world-locked or head-locked. In response to the prompt 704, the user 200 can provide a private region and/or move the prompt 704 (e.g., the placeholder box) to a private region on which the user 200 wants the private control interface rendered. For example, the user 200 can frame the prompt 704 on the private region according to how the user 200 wants the private control interface rendered.

In the second view 710 of the flow 700, the user 200 has provided a private region 706 and moved the prompt 704 onto the private region 706. The extended reality system 100 can then determine that the user 200 has selected the private control interface to be rendered on the private region 706 as shown in the second view 710.

In the third view 712 of the flow 700, the extended reality system 100 can render the private control interface 714 on the private region 706 consistent with how the user 200 placed or framed the prompt 704 on the private region 706. In some examples, the private control interface 714 rendered by the extended reality system 100 can be world-locked to the private region 706. In some cases, the private control interface 714 can move with the private region 706 any time the private region 706 moves. In other cases, the extended reality system 100 can remove the private control interface 714 if the private region 706 moves or is removed. In yet other cases, to maintain consistent placement of the private control interface 714, the extended reality system 100 can continue to render the private control interface 714 at its current location when the private region 706 is moved/removed regardless of privacy concerns (e.g., even if doing so will cause the private control interface 714 to become visible from the open door 606A or to the other user 606B).

Figure 8:
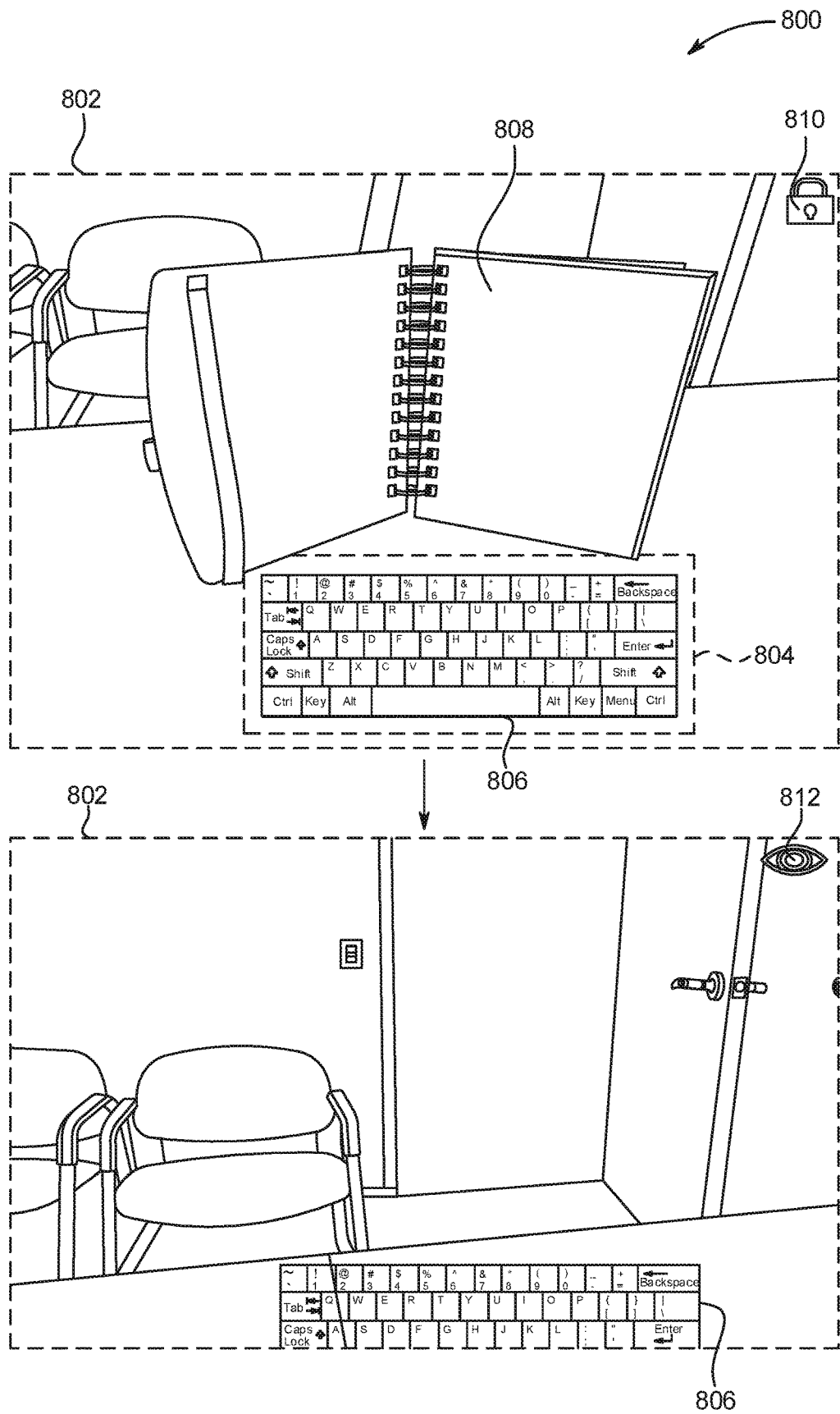
FIG. 8 is a diagram illustrating an example of a security indicator in a rendered presentation, in accordance with some examples of the present disclosure.

FIG. 8 illustrates example security indicator in a rendered presentation 800. Here, a private control interface 806 is rendered on a private region 804 in a scene 802. The private region 804 is a flat surface on a desk that is occluded by an object 808. In this example, the object 808 is a notebook. However, the object providing the occlusion can be any other object capable of blocking a visibility to the private region 804, such as, for example, a clipboard, a phone, a hand, a book, a monitor, a chair, a lamp, etc.

Since the object 808 is blocking a visibility to the private region 804, the extended reality system 100 can determine that the private control interface 806 is private (e.g., occluded from other user or risk objects, outside of a FOV of other users or risk objects, etc.). Accordingly, the extended reality system 100 can render a security indicator 810 that indicates to the user that the private control interface is currently private.

If the object 808 occluding the private control interface 806 is removed and the private control interface 806 becomes exposed to, or visible by, other users or risk objects, the extended reality system 100 can determine that the private control interface 806 being rendered is no longer private. The extended reality system 100 can then render a security indicator 812 indicating to the user that the private control interface 806 is no longer private. The user can request that the private control interface 806 be removed or maintained. If the user requests that the private control interface 806 be removed, the extended reality system 100 can stop rendering the private control interface 806 accordingly. On the other hand, if the user requests that the private control interface 806 be left where rendered, the extended reality system 100 can continue to render the private control interface 806 even if the private control interface 806 is no longer private.

Figure 9:
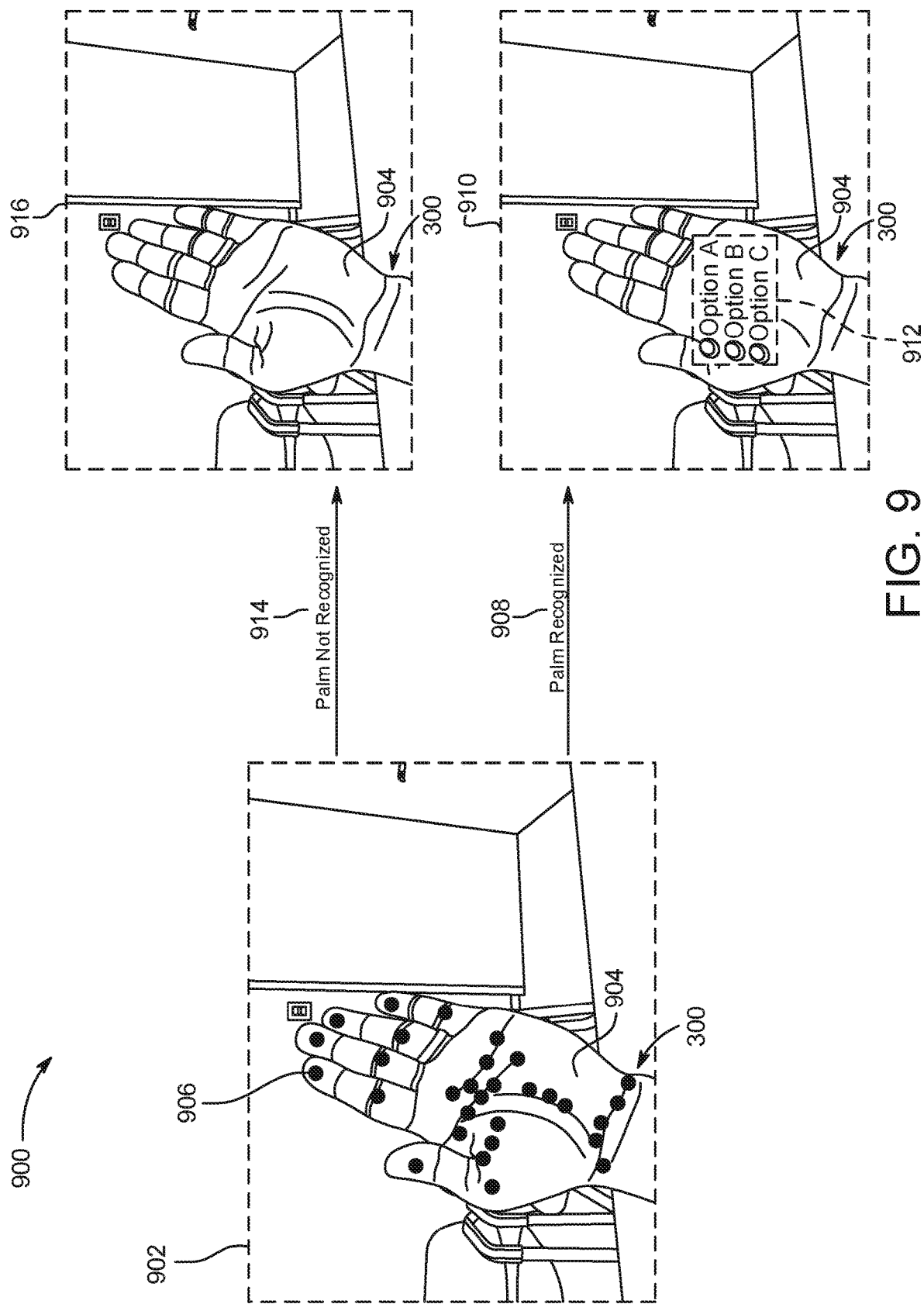
FIG. 9 is a diagram illustrating an example scheme for verifying biometric information before rendering a private control interface on a user's body, in accordance with some examples of the present disclosure.

FIG. 9 illustrates an example scheme 900 for verifying biometric information before rendering a private control interface on a user's body. The extended reality system 100 can verify biometric information before rendering a private control interface on a user's body as a security measure to ensure that the private control interface is not rendered on another user's body.

In a first view 902, the user has raised a hand 300 with the palm 904 facing the extended reality system 100. The extended reality system 100 can capture one or more images of the palm 904 and analyze the one or more images to identify features 906 on the palm 904. The extended reality system 100 can use the features 906 on the palm 904 to recognize the palm 904. The extended reality system 100 can also use the features 906 on the palm 904 as palm biometrics to verify whether the palm 904 belongs to the user or is another user's palm.

In some examples, the extended reality system 100 can implement a neural network to identify the features 906 on the palm 904 and recognize the palm 904 as belonging to the user. The extended reality system 100 can recognize the palm 904 as belonging to the user by matching the features 906, which can serve as palm biometrics, to previously-registered biometric data associated with the palm of that user. If the extended reality system 100 determines that the biometrics of the palm 904 (e.g., the features 906) match previously-registered biometrics associated with the palm of the user, the extended reality system 100 can recognize the palm 904 (shown as operation 908) as the palm of the user. On the other hand, if the extended reality system 100 determines that the biometrics of the palm 904 do not match previously-registered biometrics associated with the palm of the user, the extended reality system 100 can determine that the palm 904 is not recognized (e.g., is not verified to be the palm of the user) (shown as operation 914).

In view 910, after recognizing the palm 904 as belonging to the user, the extended reality system 100 can render the private control interface 912 on the palm 904. Alternatively, in view 916, if the extended reality system 100 does not recognize the palm 904, the extended reality system 100 may not render the private control interface on the palm 904 as doing so may expose the private control interface and associated data to another user.

Having disclosed example systems, components and concepts, the disclosure now turns to the example method 1000 for generating a private control interface for an XR experience, as shown in FIG. 10. The steps outlined herein are non-limiting examples provided for illustration purposes, and can be implemented in any combination thereof, including combinations that exclude, add, or modify certain steps.

At block 1002, the method 1000 can include determining a pose of an extended reality device (e.g., 100, 220) within a mapped scene of a physical environment associated with the extended reality device. In some examples, the pose of the extended reality device can be calculated based on one or more images of a scene (in the physical/real world/ environment) obtained by one or more image sensors (e.g., 102, 118) and measurements from one or more other sensors. In some cases, the one or more other sensors can include an accelerometer (e.g., 104) and a gyroscope (e.g., 106). Moreover, the measurements can include a rotational vector (e.g., yaw, pitch, roll) and a motion vector (e.g., up/down, left/right, forward/back).

At block 1004, the method 1000 can include detecting a private region (e.g., 602, 612, 622, 632) in the physical environment (and/or a scene in the physical world/environment mapped by a 3D map) and a location of the private region relative to the pose of the extended reality device. In some examples, the private region can include an area estimated to be within a FOV of a user (e.g., 200) of the extended reality device and out of a respective FOV of a person in the physical environment (and/or the mapped scene), a recording device (e.g., a camera) in the physical environment (and/or the mapped scene), and/or an object in the physical environment (and/or the mapped scene) that enables viewing access from outside of the physical environment. In some cases, the object can include, for example and without limitation, a window, a glass door, an open door, and/or any object that may allow other users to have viewing access from the object.

In some examples, detecting the private region can include calculating human face location data associated with a first face corresponding to the person; based on the human face location data, calculating a FOV of the person; and determining, based on the FOV of the person and the location of the private region, that the private region is occluded from a view of the person by one or more objects located between the private region and the person. In some cases, the first face can be detected based on an image capturing the mapped scene and the first face. Moreover, in some cases, the human face location data can be calculated using a neural network configured for human face recognition and/or location estimation.

In some aspects, detecting the private region can further include calculating human face location data associated with a second face corresponding to the user; based on the human face location data associated with the second face, calculating the FOV of the user; and determining, based on the location of the private region, that the private region is within the FOV of the user. In some examples, the second face can be detected based on the image capturing the mapped scene (and/or the physical environment). For example, the image can also capture the second face and can be analyzed to detect the second face within the image.

In some examples, the private region can include a surface of a body part associated with the user, and detecting the private region can include determining that the surface of the body part is facing the user and facing away from the person in the physical environment, the recording device in the physical environment, and/or the object in the physical environment. In some cases, the body part can include a hand and the surface of the body part can include a palm of the hand. In some examples, detecting the private region can include detecting, based on one or more images of the palm of the hand, biometric information associated with the palm of the hand; comparing the biometric information with previously-registered biometric information associated with a previously-registered palm associated with the user; and determining that the biometric information matches the previously-registered biometric information.

In some cases, detecting the private region can include detecting one or more objects in the physical environment (and/or within the mapped scene); detecting, based on the one or more objects in the physical environment (and/or within the mapped scene), one or more occlusions in the physical environment (and/or within the mapped scene); and detecting the private region by determining that the one or more occlusions block a visibility of the private region by the person, the recording device, and/or the object. In some examples, detecting the one or more occlusions in the physical environment (and/or within the mapped scene) can include tracing a path of a ray within the physical environment (e.g., ray tracing).

At block 1006, the method 1000 can include mapping, based on the pose of the extended reality device and the private region being detected, a virtual private control interface (e.g., 604, 614, 634, 636) to the private region. In some examples, the virtual private control interface can be mapped to the location of the private region within the mapped scene and/or the physical environment. In some cases, the virtual private control interface can include one or more input interface elements. In some examples, the virtual private control interface can include a virtual keyboard, a virtual pin pad, a virtual joystick, a virtual controller, a virtual button, and/or a virtual input field. The virtual private control interface can refer to a virtual interface rendered as if located and/or to appear to be located in a private region/location in a physical scene/environment (e.g., within a FOV of the user but outside of a FOV of other people and/or risk objects), hidden from a FOV of other people and/or risk objects, and/or occluded/obfuscated from a FOV of other people and/or risk objects.

At block 1008, the method 1000 can include rendering the virtual private control interface within the private region in the mapped scene. Rendering the private control interface within the private region can include rendering a virtual/digital overlay of the private control interface on or within the private region and/or rendering the private control interface to appear to a user viewing the private control interface from/through an extended reality system (e.g., 100, 220) as if located, presented, or projected on the private region.

In some cases, rendering the virtual private control interface within the private region can include sizing and/or aligning the virtual private control interface to fit within the private region and align with the private region. In some cases, the virtual private control interface can be an augmented reality interface, and the augmented reality interface can be rendered via an augmented reality application.

In some aspects, the method 1000 can include determining that the area is out of the respective FOV of the person, the recording device, and/or the object. In some examples, the method 1000 can determine that the area is out of the respective FOV of the person, the recording device, and/or the object by detecting one or more objects in the physical environment and determining that the respective FOV of the person, the recording device, and/or the object is occluded by the one or more objects.

In some aspects, mapping the virtual private control interface to the private region and rendering the virtual private control interface within the private region can include determining a first size of the private region and/or a first orientation of the private region; determining, based on the first size of the private region and/or the first orientation of the private region, a second size of the virtual private control interface and/or a second orientation of the virtual private control interface; generating the virtual private control interface according to the second size and/or the second orientation; and aligning the virtual control interface with the private region. In some examples, the second size of the virtual private control interface can match or fit within the first size of the private region, and the second orientation of the virtual control interface can at least partially align with the first orientation of the private region.

In some aspects, the method 1000 can include identifying a palm of a hand for rendering a second virtual private control interface, and prior to rendering the second virtual private control interface on the palm of the hand, detecting, based on one or more images of the palm of the hand, biometric information associated with the palm of the hand, comparing the biometric information with previously-registered biometric information associated with a previously-registered palm associated with the user, and determining whether the biometric information matches the previously-registered biometric information.

In some examples, the method 1000 can further include determining that the biometric information does not match the previously-registered biometric information, and in response to determining that the biometric information does not match the previously-registered biometric information, determining not to render the second virtual private control interface on the palm of the hand.

In some examples, the method 1000 may be performed by one or more computing devices or apparatuses. In one illustrative example, the method 1000 can be performed by the extended reality system 100 shown in FIG. 1 and/or one or more computing devices with the computing device architecture 1100 shown in FIG. 11. In some cases, such a computing device or apparatus may include a processor, microprocessor, microcomputer, or other component of a device that is configured to carry out the steps of the method 1000. In some examples, such computing device or apparatus may include one or more sensors configured to capture image data. For example, the computing device can include a smartphone, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The method 1000 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the method 1000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 11 illustrates an example computing device architecture 1100 of an example computing device which can implement various techniques described herein. For example, the computing device architecture 1100 can implement at least some portions of the extended reality system 100 shown in FIG. 1 and/or the extended reality system 220 shown in FIG. 2. The components of the computing device architecture 1100 are shown in electrical communication with each other using a connection 1105, such as a bus. The example computing device architecture 1100 includes a processing unit (CPU or processor) 1110 and a computing device connection 1105 that couples various computing device components including the computing device memory 1115, such as read only memory (ROM) 1120 and random access memory (RAM) 1125, to the processor 1110.

The computing device architecture 1100 can include a cache of high-speed memory connected directly with, in close proximity to, or integrated as part of the processor 1110. The computing device architecture 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other computing device memory 1115 may be available for use as well. The memory 1115 can include multiple different types of memory with different performance characteristics. The processor 1110 can include any general purpose processor and a hardware or software service stored in storage device 1130 and configured to control the processor 1110 as well as a special-purpose processor where software instructions are incorporated into the processor design. The processor 1110 may be a self-contained system, containing multiple cores or processors, a bus, memory controller, cache, etc. A multi-core processor may be symmetric or asymmetric.

To enable user interaction with the computing device architecture 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art, such as a display, projector, television, speaker device. In some instances, multimodal computing devices can enable a user to provide multiple types of input to communicate with the computing device architecture 1100. The communication interface 1140 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. The storage device 1130 can include software, code, firmware, etc., for controlling the processor 1110. Other hardware or software modules are contemplated. The storage device 1130 can be connected to the computing device connection 1105. In one aspect, a hardware module that performs a particular function can include the software component stored in a computer-readable medium in connection with the necessary hardware components, such as the processor 1110, connection 1105, output device 1135, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Example 1: A method operable on an extended reality device, the method comprising determining a pose of the extended reality device within a mapped scene of a physical environment associated with the extended reality device; detecting a private region in the physical environment and a location of the private region relative to the pose of the extended reality device, the private region comprising an area estimated to be within a field of view (FOV) of a user of the extended reality device and out of a respective FOV of at least one of a person in the physical environment, a recording device in the physical environment, and an object in the physical environment that enables viewing access from outside of the physical environment; based on the pose of the extended reality device and the private region being detected, mapping a virtual private control interface to the private region, the virtual private control interface comprising one or more input interface elements; and rendering the virtual private control interface within the private region in the mapped scene.

Example 2: A method according to Example 1, further comprising determining that the area is out of the respective FOV of the at least one of the person, the recording device, and the object in the physical environment by: detecting one or more objects in the physical environment; and determining that the respective FOV of the at least one of the person, the recording device, and the object is occluded by the one or more objects.

Example 3: A method according to any of Examples 1 or 2, wherein detecting the private region comprises: calculating human face location data associated with a first face detected in an image capturing the mapped scene, wherein the first face corresponds to the person; based on the human face location data, calculating a FOV of the person; and determining, based on the FOV of the person and the location of the private region, that the private region is occluded from a view of the person by one or more objects located between the private region and the person.

Example 4: A method according to any of Examples 1 to 3, wherein detecting the private region further comprises: calculating human face location data associated with a second face detected in the image capturing the mapped scene, wherein the second face corresponds to the user; based on the human face location data associated with the second face, calculating the FOV of the user; and determining, based on the location of the private region, that the private region is within the FOV of the user.

Example 5: A method according to any of Examples 1 to 4, wherein mapping the virtual private control interface to the private region and rendering the virtual private control interface within the private region comprises: determining at least one of a first size of the private region and a first orientation of the private region; determining, based on the at least one of the first size of the private region and the first orientation of the private region, at least one of a second size of the virtual private control interface and a second orientation of the virtual private control interface, wherein the second size of the virtual private control interface matches or fits within the first size of the private region, and wherein the second orientation of the virtual private control interface at least partially aligns with the first orientation of the private region; generating the virtual private control interface according to the at least one of the second size and the second orientation; and aligning the virtual private control interface with the private region.

Example 6: A method according to any of Examples 1 to 5, wherein the object in the physical environment that enables viewing access from outside of the physical environment comprises at least one of a window, a glass door, and an open door.

Example 7: A method according to any of Examples 1 to 6, wherein the private region comprises a surface of a body part associated with the user, and wherein the detecting the private region comprises determining that the surface of the body part is facing the user and facing away from the at least one of the person in the physical environment, the recording device in the physical environment, and the object in the physical environment.

Example 8: A method according to Example 7, wherein the body part comprises a hand and the surface of the body part comprises a palm of the hand, wherein detecting the private region comprises: detecting, based on one or more images of the palm of the hand, biometric information associated with the palm of the hand; comparing the biometric information with previously-registered biometric information associated with a previously-registered palm associated with the user; and determining that the biometric information matches the previously-registered biometric information.

Example 9: A method according to any of Examples 1 to 8, further comprising identifying a palm of a hand for rendering a second virtual private control interface; and prior to rendering the second virtual private control interface on the palm of the hand: detecting, based on one or more images of the palm of the hand, biometric information associated with the palm of the hand; comparing the biometric information with previously-registered biometric information associated with a previously-registered palm associated with the user; and determining whether the biometric information matches the previously-registered biometric information.

Example 10: A method according to Example 9, further comprising: determining that the biometric information does not match the previously-registered biometric information; and in response to determining that the biometric information does not match the previously-registered biometric information, determining not to render the second virtual private control interface on the palm of the hand.

Example 11: A method according to any of Examples 1 to 10, wherein detecting the private region comprises: detecting one or more objects in the physical environment; detecting, based on the one or more objects in the physical environment, one or more occlusions in the physical environment; and detecting the private region by determining that the one or more occlusions block a visibility of the private region by the person, the recording device, or the object.

Example 12: A method according to Example 11, wherein detecting the one or more occlusions in the physical environment comprises tracing a path of a ray within the physical environment.

Example 13: A method according to any of Examples 1 to 12, wherein the recording device comprises a camera, and wherein the virtual private control interface comprises an augmented reality interface.

Example 14: An apparatus comprising at least one memory and one or more processors implemented in circuitry and configured to determine a pose of an apparatus within a mapped scene of a physical environment associated with the apparatus; detect a private region in the physical environment and a location of the private region relative to the pose of the apparatus, the private region comprising an area estimated to be within a field of view (FOV) of a user of the apparatus and out of a respective FOV of at least one of a person in the physical environment, a recording device in the physical environment, and an object in the physical environment that enables viewing access from outside of the physical environment; based on the pose of the apparatus and the private region being detected, map a virtual private control interface to the private region, the virtual private control interface comprising one or more input interface elements; and render the virtual private control interface within the private region in the mapped scene.

Example 15: An apparatus according to Example 14, the one or more processors being configured to determine that the area is out of the respective FOV of the at least one of the person, the recording device, and the object in the physical environment by: detecting one or more objects in the physical environment; and determining that the respective FOV of the at least one of the person, the recording device, and the object is occluded by the one or more objects.

Example 16: An apparatus according to any of Examples 14 or 15, wherein detecting the private region comprises: calculating human face location data associated with a first face detected in an image capturing the mapped scene, wherein the first face corresponds to the person; based on the human face location data, calculating a FOV of the person; and determining, based on the FOV of the person and the location of the private region, that the private region is occluded from a view of the person by one or more objects located between the private region and the person.

Example 17: An apparatus according to any of Examples 14 to 16, wherein detecting the private region further comprises: calculating human face location data associated with a second face detected in the image capturing the mapped scene, wherein the second face corresponds to the user; based on the human face location data associated with the second face, calculating the FOV of the user; and determining, based on the location of the private region, that the private region is within the FOV of the user.

Example 18: An apparatus according to any of Examples 14 to 17, wherein mapping the virtual private control interface to the private region and rendering the virtual private control interface within the private region comprises: determining at least one of a first size of the private region and a first orientation of the private region; determining, based on the at least one of the first size of the private region and the first orientation of the private region, at least one of a second size of the virtual private control interface and a second orientation of the virtual private control interface, wherein the second size of the virtual private control interface matches or fits within the first size of the private region, and wherein the second orientation of the virtual private control interface at least partially aligns with the first orientation of the private region; generating the virtual private control interface according to the at least one of the second size and the second orientation; and aligning the virtual private control interface with the private region.

Example 19: An apparatus according to any of Examples 14 to 18, wherein the object in the physical environment that enables viewing access from outside of the physical environment comprises at least one of a window, a glass door, and an open door.

Example 20: An apparatus according to any of Examples 14 to 19, wherein the private region comprises a surface of a body part associated with the user, and wherein the detecting the private region comprises determining that the surface of the body part is facing the user and facing away from the at least one of the person in the physical environment, the recording device in the physical environment, or the object in the physical environment.

Example 21: An apparatus according to Example 20, wherein the body part comprises a hand and the surface of the body part comprises a palm of the hand, wherein detecting the private region comprises: detecting, based on one or more images of the palm of the hand, biometric information associated with the palm of the hand; comparing the biometric information with previously-registered biometric information associated with a previously-registered palm associated with the user; and determining that the biometric information matches the previously-registered biometric information.

Example 22: An apparatus according to any of Examples 14 to 21, the one or more processors being configured to identify a palm of a hand for rendering a second virtual private control interface; and prior to rendering the second virtual private control interface on the palm of the hand: detect, based on one or more images of the palm of the hand, biometric information associated with the palm of the hand; compare the biometric information with previously-registered biometric information associated with a previously-registered palm associated with the user; and determine whether the biometric information matches the previously-registered biometric information.

Example 23: An apparatus according to Example 22, the one or more processors being configured to: determine that the biometric information does not match the previously-registered biometric information; and in response to determining that the biometric information does not match the previously-registered biometric information, determine not to render the second virtual private control interface on the palm of the hand.

Example 24: An apparatus according to any of Examples 14 to 23, wherein detecting the private region comprises: detecting one or more objects in the physical environment; detecting, based on the one or more objects in the physical environment, one or more occlusions in the physical environment; and detecting the private region by determining that the one or more occlusions block a visibility of the private region by the person, the recording device, or the object.

Example 25: An apparatus according to Example 24, wherein detecting the one or more occlusions in the physical environment comprises tracing a path of a ray within the physical environment.

Example 26: An apparatus according to any of Examples 14 to 25, wherein the recording device comprises a camera, and wherein the virtual private control interface comprises an augmented reality interface.

Example 27: An apparatus according to any of Examples 14 to 26, wherein the apparatus is a mobile device.

Example 28: An apparatus according to any of Examples 14 to 27, wherein the apparatus comprises an extended reality device.

Example 29: At least one non-transitory computer-readable storage medium having stored thereon instructions that, when executed by one or more processors, cause the one or more processors to determine a pose of an extended reality device within a mapped scene of a physical environment associated with the extended reality device; detect a private region in the physical environment and a location of the private region relative to the pose of the extended reality device, the private region comprising an area estimated to be within a field of view (FOV) of a user of the extended reality device and out of a respective FOV of at least one of a person in the physical environment, a recording device in the physical environment, and an object in the physical environment that enables viewing access from outside of the physical environment; based on the pose of the extended reality device and the private region being detected, map a virtual private control interface to the private region, the virtual private control interface comprising one or more input interface elements; and render the virtual private control interface within the private region in the mapped scene.

Example 30: At least one non-transitory computer-readable storage medium according to Example 29, comprising determining that the area is out of the respective FOV of the at least one of the person, the recording device, and the object in the physical environment by: detecting one or more objects in the physical environment; and determining that the respective FOV of the at least one of the person, the recording device, and the object is occluded by the one or more objects.

Example 31: At least one non-transitory computer-readable storage medium according to any of Examples 29 or 30, wherein detecting the private region comprises: calculating human face location data associated with a first face detected in an image capturing the mapped scene, wherein the first face corresponds to the person; based on the human face location data, calculating a FOV of the person; and determining, based on the FOV of the person and the location of the private region, that the private region is occluded from a view of the person by one or more objects located between the private region and the person.

Example 32: At least one non-transitory computer-readable storage medium according to any of Examples 29 to 31, wherein detecting the private region further comprises: calculating human face location data associated with a second face detected in the image capturing the mapped scene, wherein the second face corresponds to the user; based on the human face location data associated with the second face, calculating the FOV of the user; and determining, based on the location of the private region, that the private region is within the FOV of the user.

Example 33: At least one non-transitory computer-readable storage medium according to any of Examples 29 to 32, wherein mapping the virtual private control interface to the private region and rendering the virtual private control interface within the private region comprises: determining at least one of a first size of the private region and a first orientation of the private region; determining, based on the at least one of the first size of the private region and the first orientation of the private region, at least one of a second size of the virtual private control interface and a second orientation of the virtual private control interface, wherein the second size of the virtual private control interface matches or fits within the first size of the private region, and wherein the second orientation of the virtual private control interface at least partially aligns with the first orientation of the private region; generating the virtual private control interface according to the at least one of the second size and the second orientation; and aligning the virtual private control interface with the private region.

Example 34: At least one non-transitory computer-readable storage medium according to any of Examples 29 to 33, wherein the object in the physical environment that enables viewing access from outside of the physical environment comprises at least one of a window, a glass door, and an open door.

Example 35: At least one non-transitory computer-readable storage medium according to any of Examples 29 to 34, wherein the private region comprises a surface of a body part associated with the user, and wherein the detecting the private region comprises determining that the surface of the body part is facing the user and facing away from the at least one of the person in the physical environment, the recording device in the physical environment, or the object in the physical environment.

Example 36: At least one non-transitory computer-readable storage medium according to Example 35, wherein the body part comprises a hand and the surface of the body part comprises a palm of the hand, wherein detecting the private region comprises: detecting, based on one or more images of the palm of the hand, biometric information associated with the palm of the hand; comparing the biometric information with previously-registered biometric information associated with a previously-registered palm associated with the user; and determining that the biometric information matches the previously-registered biometric information.

Example 37: At least one non-transitory computer-readable storage medium according to any of Examples 29 to 36, further comprising instructions that, when executed by one or more processors, cause the one or more processors to identify a palm of a hand for rendering a second virtual private control interface; and prior to rendering the second virtual private control interface on the palm of the hand: detect, based on one or more images of the palm of the hand, biometric information associated with the palm of the hand; compare the biometric information with previously-registered biometric information associated with a previously-registered palm associated with the user; and determine whether the biometric information matches the previously-registered biometric information.

Example 38: At least one non-transitory computer-readable storage medium according to Example 37, further comprising instructions that, when executed by one or more processors, cause the one or more processors to determine that the biometric information does not match the previously-registered biometric information; and in response to determining that the biometric information does not match the previously-registered biometric information, determine not to render the second virtual private control interface on the palm of the hand.

Example 39: At least one non-transitory computer-readable storage medium according to any of Examples 29 to 38, wherein detecting the private region comprises: detecting one or more objects in the physical environment; detecting, based on the one or more objects in the physical environment, one or more occlusions in the physical environment; and detecting the private region by determining that the one or more occlusions block a visibility of the private region by the person, the recording device, or the object.

Example 40: At least one non-transitory computer-readable storage medium according to any of Examples 29 to 39, wherein detecting the one or more occlusions in the physical environment comprises tracing a path of a ray within the physical environment.

Example 41: At least one non-transitory computer-readable storage medium according to any of Examples 29 to 40, wherein the recording device comprises a camera, and wherein the virtual private control interface comprises an augmented reality interface.

Example 42: An apparatus comprising means for performing a method according to any of Examples 1 to 13.

What is claimed is:

1. A method operable on an extended reality device, the method comprising:
   determining a pose of the extended reality device within a mapped scene of a physical environment associated with the extended reality device;
   detecting a private region in the mapped scene and a location of the private region relative to the pose of the extended reality device, the private region comprising an area estimated to be within a field of view (FOV) of a user of the extended reality device and out of a respective FOV of at least one of a person in the physical environment, a recording device in the physical environment, and an object in the physical environment that enables viewing access from outside of the physical environment;
   based on the pose of the extended reality device and the private region being detected, mapping a virtual private control interface to the private region; and
   rendering the virtual private control interface within the private region in the mapped scene.

2. The method of claim 1, further comprising determining that the area is out of the respective FOV of the at least one of the person, the recording device, and the object in the physical environment by:
   detecting one or more objects in the physical environment; and
   determining that the respective FOV of the at least one of the person, the recording device, and the object is occluded by the one or more objects.

3. The method of claim 1, wherein detecting the private region comprises:
calculating human face location data associated with a first face detected in an image capturing the mapped scene, wherein the first face corresponds to the person;
based on the human face location data, calculating a FOV of the person; and
determining, based on the FOV of the person and the location of the private region, that the private region is occluded from a view of the person by one or more objects located between the private region and the person.

4. The method of claim 3, wherein detecting the private region further comprises:
calculating human face location data associated with a second face detected in the image capturing the mapped scene, wherein the second face corresponds to the user;
based on the human face location data associated with the second face, calculating the FOV of the user; and
determining, based on the location of the private region, that the private region is within the FOV of the user.

5. The method of claim 1, wherein mapping the virtual private control interface to the private region and rendering the virtual private control interface within the private region comprises:
determining at least one of a first size of the private region and a first orientation of the private region;
determining, based on the at least one of the first size of the private region and the first orientation of the private region, at least one of a second size of the virtual private control interface and a second orientation of the virtual private control interface, wherein the second size of the virtual private control interface matches or fits within the first size of the private region, and wherein the second orientation of the virtual private control interface at least partially aligns with the first orientation of the private region;
generating the virtual private control interface according to the at least one of the second size and the second orientation; and
aligning the virtual private control interface with the private region.

6. The method of claim 1, wherein the object in the physical environment that enables viewing access from outside of the physical environment comprises at least one of a window, a glass door, and an open door.

7. The method of claim 1, wherein the private region comprises a surface of a body part associated with the user, and wherein the detecting the private region comprises determining that the surface of the body part is facing the user and facing away from the at least one of the person in the physical environment, the recording device in the physical environment ne, and the object in the physical environment that enables the viewing access.

8. The method of claim 7, wherein the body part comprises a hand and the surface of the body part comprises a palm of the hand, wherein detecting the private region comprises:
detecting, based on one or more images of the palm of the hand, biometric information associated with the palm of the hand;
comparing the biometric information with previously-registered biometric information associated with a previously-registered palm associated with the user; and
determining that the biometric information matches the previously-registered biometric information.

9. The method of claim 1, further comprising:
identifying a palm of a hand for rendering a second virtual private control interface; and
prior to rendering the second virtual private control interface on the palm of the hand:
detecting, based on one or more images of the palm of the hand, biometric information associated with the palm of the hand;
comparing the biometric information with previously-registered biometric information associated with a previously-registered palm associated with the user; and
determining whether the biometric information matches the previously-registered biometric information.

10. The method of claim 9, further comprising:
determining that the biometric information does not match the previously-registered biometric information; and
in response to determining that the biometric information does not match the previously-registered biometric information, determining not to render the second virtual private control interface on the palm of the hand.

11. The method of claim 1, wherein detecting the private region comprises:
detecting one or more objects in the mapped scene;
detecting, based on the one or more objects in the mapped scene, one or more occlusions in the mapped scene; and
detecting the private region by determining that the one or more occlusions block a visibility of the private region by the person, of the recording device, or the object in the physical environment that enables the viewing access.

12. The method of claim 11, wherein detecting the one or more occlusions comprises tracing a path of a ray within the physical environment.

13. The method of claim 1, wherein the recording device comprises a camera, and wherein the virtual private control interface comprises an augmented reality interface.

14. An apparatus comprising:
at least one memory; and
one or more processors implemented in circuitry and configured to:
determine a pose of an apparatus within a mapped scene of a physical environment associated with the apparatus;
detect a private region in the mapped scene and a location of the private region relative to the pose of the apparatus, the private region comprising an area estimated to be within a field of view (FOV) of a user of the apparatus and out of a respective FOV of at least one of a person in the physical environment, a recording device in the physical environment, and an object in the physical environment that enables viewing access from outside of the physical environment;
map, based on the pose of the apparatus and the private region being detected, a virtual private control interface to the private region, the virtual private control interface comprising one or more input interface elements; and
render the virtual private control interface within the private region in the mapped scene.

15. The apparatus of claim 14, the one or more processors being configured to determine that the area is out of the respective FOV of the at least one of the person, the recording device, and the object in the physical environment by:

detecting one or more objects in the physical environment; and determining that the respective FOV of the at least one of the person, the recording device, and the object is occluded by the one or more objects.

16. The apparatus of claim 14, wherein detecting the private region comprises:

calculating human face location data associated with a first face detected in an image capturing the mapped scene, wherein the first face corresponds to the person;

calculating, based on the human face location data, a FOV of the person; and determining, based on the FOV of the person and the location of the private region, that the private region is occluded from a view of the person by one or more objects located between the private region and the person.

17. The apparatus of claim 16, wherein detecting the private region further comprises:

calculating human face location data associated with a second face detected in the image capturing the mapped scene, wherein the second face corresponds to the user;

calculating, based on the human face location data associated with the second face, the FOV of the user; and determining, based on the location of the private region, that the private region is within the FOV of the user.

18. The apparatus of claim 14, wherein mapping the virtual private control interface to the private region and rendering the virtual private control interface within the private region comprises:

determining at least one of a first size of the private region and a first orientation of the private region;

determining, based on the at least one of the first size of the private region and the first orientation of the private region, at least one of a second size of the virtual private control interface and a second orientation of the virtual private control interface, wherein the second size of the virtual private control interface matches or fits within the first size of the private region, and wherein the second orientation of the virtual private control interface at least partially aligns with the first orientation of the private region;

generating the virtual private control interface according to the at least one of the second size and the second orientation; and aligning the virtual private control interface with the private region.

19. The apparatus of claim 14, wherein the object in the physical environment that enables viewing access from outside of the physical environment comprises at least one of a window, a glass door, and an open door.

20. The apparatus of claim 14, wherein the private region comprises a surface of a body part associated with the user, and wherein detecting the private region comprises determining that the surface of the body part is facing the user and facing away from the at least one of the person in the physical environment, the recording device in the physical environment, and the object in the physical environment that enables the viewing access.

21. The apparatus of claim 20, wherein the body part comprises a hand and the surface of the body part comprises a palm of the hand, wherein detecting the private region comprises:

detecting, based on one or more images of the palm of the hand, biometric information associated with the palm of the hand;

comparing the biometric information with previously-registered biometric information associated with a previously-registered palm associated with the user; and determining that the biometric information matches the previously-registered biometric information.

22. The apparatus of claim 14, the one or more processors being configured to:

identify a palm of a hand for rendering a second virtual private control interface; and prior to rendering the second virtual private control interface on the palm of the hand:

detect, based on one or more images of the palm of the hand, biometric information associated with the palm of the hand;

compare the biometric information with previously-registered biometric information associated with a previously-registered palm associated with the user; and determine whether the biometric information matches the previously-registered biometric information.

23. The apparatus of claim 22, the one or more processors being configured to:

determine that the biometric information does not match the previously-registered biometric information; and in response to determining that the biometric information does not match the previously-registered biometric information, determine not to render the second virtual private control interface on the palm of the hand.

24. The apparatus of claim 14, wherein detecting the private region comprises:

detecting one or more objects in the physical environment;

detecting, based on the one or more objects in the physical environment, one or more occlusions in the physical environment; and detecting the private region by determining that the one or more occlusions block a visibility of the private region by the person, the recording device, or the object.

25. The apparatus of claim 24, wherein detecting the one or more occlusions in the physical environment comprises tracing a path of a ray within the physical environment.

26. The apparatus of claim 14, wherein the recording device comprises a camera, and wherein the virtual private control interface comprises an augmented reality interface.

27. The apparatus of claim 14, wherein the apparatus is a mobile device.

28. The apparatus of claim 14, wherein the apparatus comprises an extended reality device.

29. At least one non-transitory computer-readable storage medium having stored thereon instructions that, when executed by one or more processors, cause the one or more processors to:

determine a pose of an extended reality device within a mapped scene of a physical environment associated with the extended reality device;

detect a private region in the mapped scene and a location of the private region relative to the pose of the extended reality device, the private region comprising an area estimated to be within a field of view (FOV) of a user of the extended reality device and out of a respective FOV of at least one of a person in the physical environment, a recording device in the physical environment, and an object in the physical environment that enables viewing access from outside of the physical environment;

map, based on the pose of the extended reality device and the private region being detected, a virtual private control interface to the private region, the virtual private control interface comprising one or more input interface elements; and render the virtual private control interface within the private region in the mapped scene.

30. The at least one non-transitory computer-readable storage medium of claim 29, wherein determining that the area is out of the respective FOV of the at least one of the person, the recording device, and the object by:

detecting one or more objects in the physical environment; and determining that the respective FOV of the at least one of the person, the recording device, and the object is occluded by the one or more objects.

* * * * *